United States Patent
Fujita et al.

(10) Patent No.: US 7,460,611 B2
(45) Date of Patent: Dec. 2, 2008

(54) COMMUNICATION SYSTEM, TRANSMITTING APPARATUS AND TRANSMITTING METHOD, RECEIVING APPARATUS AND RECEIVING METHOD, UNBALANCE CODE MIXING METHOD AND MULTIPLE CODE DECODING METHOD

(75) Inventors: Chihiro Fujita, Kanagawa (JP); Mitsuhiro Suzuki, Chiba (JP)

(73) Assignee: Sony Corporation, Tokyo (JP)

( * ) Notice: Subject to any disclaimer, the term of this patent is extended or adjusted under 35 U.S.C. 154(b) by 846 days.

(21) Appl. No.: 10/720,125

(22) Filed: Nov. 25, 2003

(65) Prior Publication Data
US 2004/0157614 A1 Aug. 12, 2004

(30) Foreign Application Priority Data
Nov. 28, 2002 (JP) .............................. 2002-345041

(51) Int. Cl.
*H04B 15/00* (2006.01)
(52) U.S. Cl. .................. 375/285; 375/296; 375/260; 375/299; 455/63.1; 332/159; 332/162
(58) Field of Classification Search ............... 375/285, 375/316, 295, 296, 260, 299; 332/159, 162; 455/63.1
See application file for complete search history.

(56) References Cited

U.S. PATENT DOCUMENTS

| 6,023,492 | A * | 2/2000 | Norman .................. 375/341 |
| 6,473,418 | B1 * | 10/2002 | Laroia et al. ............. 370/344 |
| 7,027,533 | B2 * | 4/2006 | Abe et al. ................ 375/341 |
| 7,260,366 | B2 * | 8/2007 | Lee et al. ................. 455/102 |
| 2001/0031014 | A1 * | 10/2001 | Subramanian et al. ..... 375/260 |
| 2001/0034868 | A1 * | 10/2001 | El-Gamal et al. ......... 714/755 |
| 2002/0136334 | A1 * | 9/2002 | Nagayasu ................ 375/350 |
| 2003/0035491 | A1 * | 2/2003 | Walton et al. ............ 375/267 |
| 2003/0076783 | A1 * | 4/2003 | Das et al. ................ 370/236 |

* cited by examiner

*Primary Examiner*—Mohammad Ghayour
*Assistant Examiner*—Leila Malek
(74) *Attorney, Agent, or Firm*—Oblon, Spivak, McClelland, Maier & Neustadt, P.C.

(57) ABSTRACT

A transmitting station side transmits a transmitting signal obtained by a process of segmenting transmission information into a plurality of frames, of encoding each frame, of power amplifying each encoded signal with different amplitude, and of interleaving all signals with each amplitude signal collected into one. A receiving station side reproduces of the above transmitting signal into original segmental frames by a process of de-interleaving the above transmitting signal, of successively decoding codes of the signal in descending order of SINR, and of re-encoding the decoded signal to successively cancel the re-encoded signal from the above transmitting signal.

26 Claims, 19 Drawing Sheets

F I G. 8
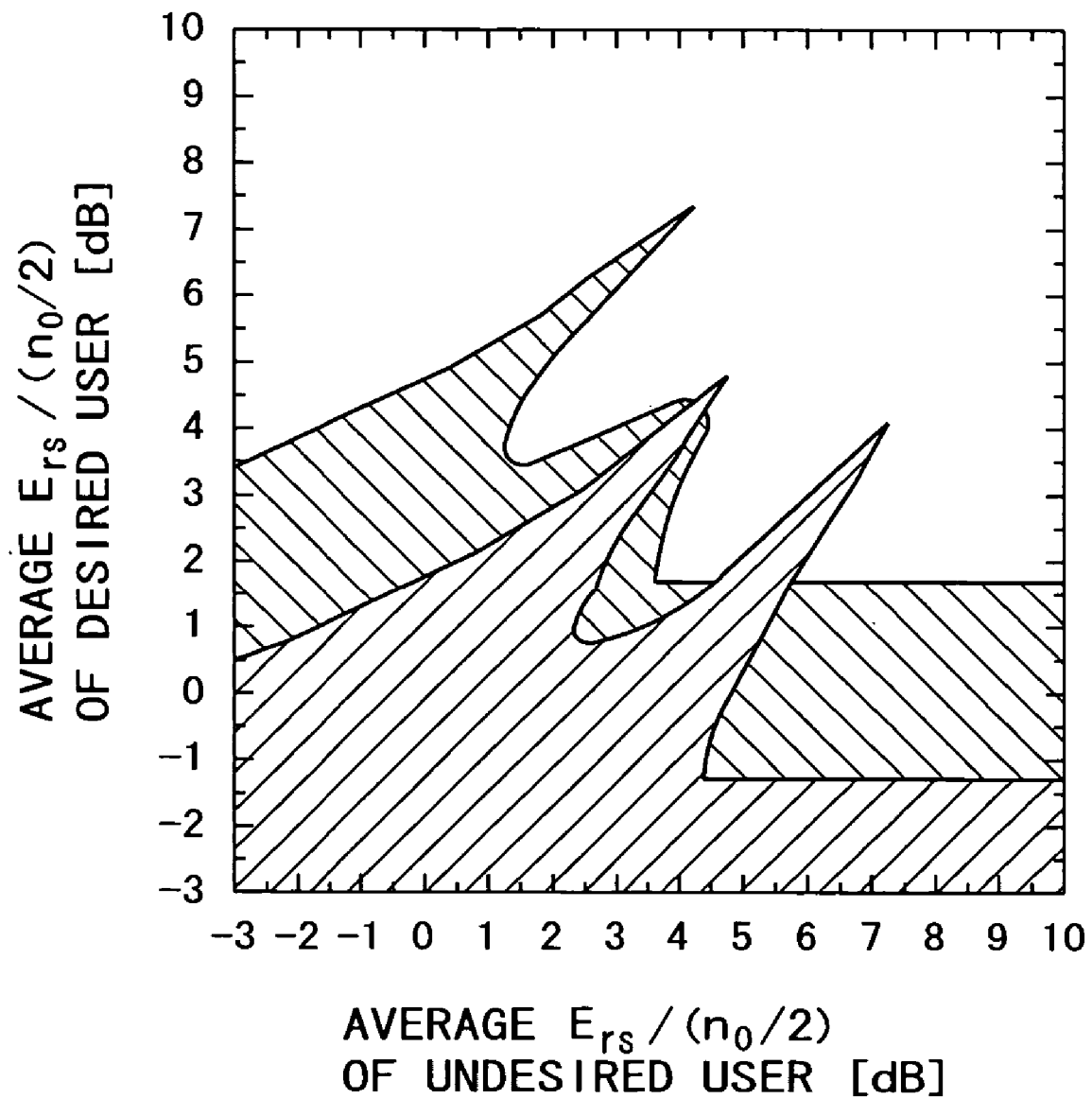

F I G. 9
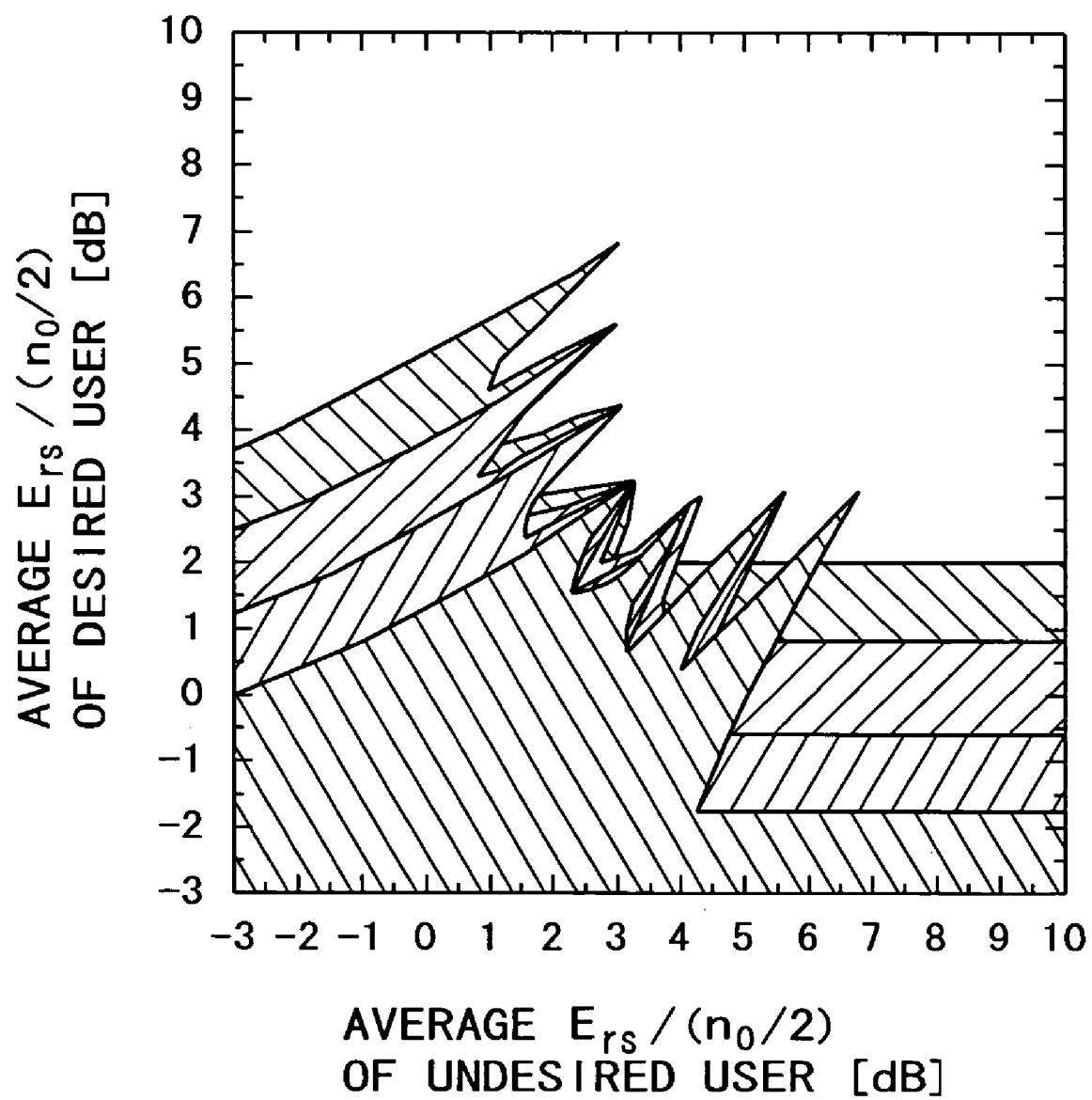

COMMUNICATION SYSTEM, TRANSMITTING APPARATUS AND TRANSMITTING METHOD, RECEIVING APPARATUS AND RECEIVING METHOD, UNBALANCE CODE MIXING METHOD AND MULTIPLE CODE DECODING METHOD

CROSS REFERENCES TO RELATED APPLICATIONS

The present document is based on Japanese Priority Document JP 2002-345041, filed in the Japanese Patent Office on Nov. 28, 2002, the entire contents of which being incorporated herein by reference. In addition, the present application is a related application of a PCT international application PCT/JP03/01583 and Japanese Patent Applications No. 2002-007959 and No. 2002-007958.

BACKGROUND OF THE INVENTION

1. Field of the Invention

The present invention relates to a communication system, a transmitting apparatus and a transmitting method, a receiving apparatus and a receiving method, an unbalance code mixing (UCM) method and a multiple code decoding method, which are operating under a multiple access environment where a plurality of mobile terminals are in communication with a single base station simultaneously, and more particularly, to a communication system, a transmitting apparatus and a transmitting method, a receiving apparatus and a receiving method, an unbalance code mixing and a multiple code decoding method, which are to expand a capacity by canceling in- and out-cell interference.

More specifically, the present invention relates to a communication system, a transmitting apparatus and a transmitting method, a receiving apparatus and a receiving method, an unbalance code mixing method and a multiple code decoding method, which are to increase a capacity by performing operations with a very short frequency reuse, more particularly, to a communication system, a transmitting apparatus and a transmitting method, a receiving apparatus and a receiving method, an unbalance code mixing method and a multiple code decoding method, which are to increase a capacity by implementing one-frequency reuse using a non-spread spectrum cellular system.

2. Description of the Related Art

The cause of mobile communications was because electromagnetic waves were discovered, and thereafter, further researches and developments of the mobile communications have been made due to the necessity for communication with ships, airplanes and/or trains. Further, the subject of the mobile communications has been widened to cover a range of communication with automobiles and/or humans. The mobile communications have also become adaptable not only to transmission of data with telegraphy and/or telephones but also to transmission of computer data and multimedia contents such as images.

In recent years, size and cost reductions of a mobile terminal are rapidly being improved with increasing fabrication technologies and the like. Also, the mobile terminal is increasingly being personalized like a mobile phone with expanding information communication services and the like. Further, mobile terminal users are being on an increase more and more as communication liberalization, communication charge reductions and the like become attainable.

Fundamentals of mobile communications are that a mobile station such as an automobile phone and a mobile phone effects detection of its nearest base station to exchange radio waves between the mobile station and the base station. A serviceable range of communication adaptable to reception of the radio waves from one base station is called a cell. The cell is typically in the shape of a circle having a given radius with a base station antenna as a center. Then, a communication service area is configured in such a way as to dispose the cells closely.

FIG. 19 schematically illustrates a cell configuration in a mobile wireless communication system such as a cellular system that permits planar development of a service area with a plurality of base stations. A broad service area is configured with the plurality of base stations (not shown) spaced at certain intervals to continuously lay a plurality of cells distributed by each base station as shown in FIG. 19.

A reason why the mobile communication system is employing the cells as described above is to provide the advantages of being able to effectively use a limited frequency resource by limiting a range of reception of the radio waves from the base stations to within a specific cell to ensure that a reuse of the same frequency is executable in other cells, and of achieving a size reduction and a power saving of a mobile terminal typically packaged as a battery-driven portable device by adapting segmentation into cells to reduction of output of the radio waves for communication. In recent years, factors such as an increased number of mobile phone users (cellular phone users) have increasingly required a technology for accepting a large number of mobile phone users as much as possible to a cell, while maximizing the effective utilization of the limited frequency resource. A single cell permits therein the existence of a plurality of mobile terminals, which are in communication with the single base station simultaneously. Thus, as judging from a base station side, a multiple access, in other words, a technology for multiplexing a radio signal to detect which signal is assigned to which user or multi-user detection is required.

A Frequency Division Multiple Access (FDMA), a Time Division Multiple Access (TDMA) for use in a second generation of a Personal Digital Cellular (PDC) and a Code Division Multiple Access (CDMA) for use in a third generation of the PDC have been conventionally known in Japan as multiple access technologies in wireless communications.

The TDMA is a system, which is to carry out communication by assigning a different time slot for each mobile terminal for simultaneous communication under the condition that a communication channel is divided into sections with the time slot on a temporal axis in advance. This communication system is premised to be of digital system. In a digital mobile phone system in Japan, time-division multiplexing into three or six channels takes place.

The FDMA is a system, which is to carry out communication by assigning a different frequency to each channel between mobile terminals for simultaneous communication or for each speech channel. Specifically, the FDMA is to use an available channel by allowing appropriate assignment thereof with a large number of communication channels arranged on a frequency axis. The FDMA is adaptable to any of analog and digital communication systems. In Japan, the FDMA is in use for automobile phones and mobile phones of an analog system.

The CDMA is a system, which is to carry out communication by applying spectrum spreading to share a wide range of frequencies with a plurality of mobile terminals. Whenever the mobile terminals are in communication, a spreading sequence for spectrum spreading is assigned to each mobile terminal, which then transmits a communication signal after spreading of the communication signal with the spreading sequence. The CDMA allows the mobile terminals to use a common frequency, so that all communication signals of stations other than one's own station result in interference to one's own station, and a performance of extracting a received signal out of the interference affects greatly on a reception level.

Now, a communication capacity is defined as the number of users acceptable to one channel for one cell. The most serious problem awaiting solution under the wireless communication environment such as that the coexistence of a large number of mobile stations within the single cell brings about because of rapid and wide spread of the mobile communications is how an increased capacity is attained with a limited resource.

The TDMA and the FDMA perform a reuse of a plurality of frequencies by assigning different frequencies to adjacent cells. A capacity of each of these systems is dependent only upon the number of channels. By contrast, the CDMA uses the same frequency between and within the cells simultaneously, and thereby suffers in- and out-cell interference. Specifically, the CDMA is considered to be a system whose capacity is not dependent upon the number of channels but upon an amount of interference.

The FDMA and the TDMA determine the upper limit of the number of users acceptable to one cell with reference to the number of channels obtained by segmenting a serviceable frequency bandwidth, and are thus limited in capacity. Also, the FDMA and the TDMA are incapable of executing the reuse of the same frequency among the cells adjoining to one another, and are thus considered to be of small capacity as the whole of communication services.

The CDMA effects code division using the spreading sequence consisting of orthogonal and pseudo-orthogonal codes, while users acceptable to one cell share the same frequency, so that all signals for other users result in undesired interference waves. The spreading sequence applied to each mobile terminal is recognizable at a base station side, so that the base station may detect each user signal. Conversely, the spreading sequence applied to other mobile terminals is not recognizable at a mobile terminal side, so that user detection is not executable. While it may be good if the spreading sequence is completely in an orthogonal arrangement, components other than orthogonal components are attributable to interference components, with the result that the number of users acceptable to one cell is smaller in proportion to the number of channels made up of the pseudo-orthogonal codes. Also, the CDMA has a tendency to use a broad frequency bandwidth because of a need for spreading, and is thus considered to be of small capacity although one-frequency reuse is executable.

The communication system based on the CDMA may achieve detection of each signal, specifically, multi-user detection by applying an interference cancellation technology such as an interference canceller IC (See Reference Document of Patent 1, for instance). The interference canceller IC is effective in detecting all received signals by repeating a process of demodulating, in order of the magnitude of reception power, the received signals that are composed of the sum of noise and in-coming signals having made propagation from each transmitting-side station through each propagation characteristic, and of canceling one's own signal.

When inter-cell multi-user detection is effected with the interference cancellation technology such as the interference canceller IC, a receiving-side station detects the in-coming signal from each of in- and out-cell transmitting-side stations on the assumption that the in-coming signal is a desired signal, so that the adjacent or neighboring cells themselves may share the channel of the same frequency spatially or temporally. Thus, a multi-cell configuration based on one-frequency reuse is realizable with the TDMA and/or the FDMA and thus makes contribution toward more efficient utilization of the frequency and also toward an increased capacity as in a case of the frequency of the same utilization.

However, a difference in reception power between a signal interfered with other cells and the desired signal is supposed to be made smaller in the vicinity of a cell boundary, leading to a case where reception of the above signals with equal power occurs. Under the above conditions, a problem of failing to achieve decoding and cancellation with the interference canceller IC arises.

[Reference Document of Patent 1]
Japanese Patent Laid-open No. 2002-84214

SUMMARY OF THE INVENTION

The present invention is intended to provide a communication system, a transmitting apparatus and a transmitting method, a receiving apparatus and a receiving method, an unbalance code mixing method and a multiple code decoding method, which are of surpassing features to ensure that an expanded capacity is attainable by canceling in- and out-cell interference.

The present invention is also intended to provide a communication system, a transmitting apparatus and a transmitting method, a receiving apparatus and a receiving method, an unbalance code mixing method and a multiple code decoding method, which are of surpassing features to ensure that an increased capacity is attainable by performing operations with a very short frequency reuse.

The present invention is further intended to provide a communication system, a transmitting apparatus and a transmitting method, a receiving apparatus and a receiving method, an unbalance code mixing method and a multiple code decoding method, which are of surpassing features to ensure that an increased capacity is attainable by implementing one-frequency reuse using a non-spread spectrum system.

The present invention has been undertaken in view of the above problems, and a first aspect thereof is to provide a communication system for increasing a capacity by implementing one-frequency reuse using a non-spread spectrum system, wherein: a transmitting station side transmits a transmitting signal obtained by a process of segmenting transmission information into a plurality of frames, of encoding each frame, of power amplifying each encoded signal with a different amplitude and of interleaving all signals with each amplified signal collected into one; and a receiving station side reproduces of the above. transmitting signal into the original segmental frames by a process of de-interleaving the above transmitting signal, of sequentially decoding codes of the signal in descending order of Signal-to-Interference and Noise power Ratio (SINR) and of re-encoding the decoded signal to carry out sequential cancellation of the re-encoded signal from the above transmitting signal.

It is noted that the "system" specified herein means a logical aggregate that is configured with a plurality of apparatuses (or functional modules for implementation of specific functions), and it does not matter whether each apparatus and/or functional module are within a single casing or not.

According to the communication system relating to the first aspect of the present invention, the receiving station side enables a desired wave and an undesired wave to be separated from each other by taking advantage of a difference in interleaving pattern. Thus, a multiple access is executable using a different interleaving pattern for each user. Alternatively, a non-spread spectrum multi-cell system ensuring one-frequency reuse may be implemented using a different interleaving pattern for each cell.

Thus, according to the communication system relating to the first aspect of the present invention, dispersion of interference signal power is attainable, leading to a reduction thereof. In a case where a desired signal is equal in reception power to an interference signal, which case becomes an issue for the conventional inter-cell multi-user detection, decoding is executable by application of the present invention to the above case. Also, a reduction in average transmission power is attainable by designing the amplitude of a power amplification unit in an appropriate manner.

It is noted that the transmitting station side may be also configured so that a rate of amplitude amplification for each frame is changed according to a decoding capability in the receiving station side. It is also noted that the decoding capability in the receiving station side may be determined with reference to the number of interference signals, noise power and the number of code words for one frame.

In addition, an increase in the number of codes to be multiplexed increases the decoding capability, but requires a complicated processing. In this connection, the transmitting station side is configured so that the number of codes to be multiplexed is determined according to the decoding capability or a process capability realizable in the receiving station side.

A second aspect of the present invention is to provide a transmitting apparatus or a transmitting method for transmitting information using a non-spread spectrum system, wherein the transmitting apparatus or the transmitting method comprises: frame segmenting means or a step of segmenting transmission information into a plurality of frames; encoding means or a step of encoding each frame; power amplification means or a step of power amplifying each encoded signal with different amplitude;

interleaving means or a step of interleaving all signals with each amplified signal collected into one; and transmitting means or a step of transmitting a transmitting signal obtained by the interleaving.

According to the transmitting apparatus or the transmitting method relating to the second aspect of the present invention, the receiving station side enables the desired wave and the undesired wave to be separated from each other by taking advantage of a difference in interleaving pattern. Thus, the non-spread spectrum multi-cell system ensuring one-frequency reuse may be implemented using a different interleaving pattern for each cell. Also, the multiple-access is executable using a different interleaving pattern for each user.

The power amplification means or the step may be also to change a rate of amplitude amplification for each frame according to the decoding capability in the receiving station side. It is noted that the decoding capability in the receiving station side may be determined with reference to the number of interference signals, noise power and the number of code words for one frame.

In addition, the frame segmenting means or the step may be also to determine the number of codes to be multiplexed according to the decoding capability or the process capability realizable in the receiving station side.

The transmitting apparatus or the transmitting method relating to the second aspect of the present invention takes measures to change the rate of amplitude amplification for each frame according to the decoding capability in the receiving station side, while an amplitude value is calculated from the number of interference signals, noise power and the number of codes having different amplitudes, for instance. It is noted that the reception power of the interference signal varies, so that interference power is set to be the worst. Then, calculation of an amplitude value of each code is performed on the assumption that the undesired wave is equal in power to the desired wave.

However, it is seldom in an actual propagation path that the power of a plurality of undesired waves is all equal to that of the desired wave, resulting in a problem of causing a transmission power loss in the greater part of the propagation path conditions. Also, the cell disposition conditions and/or traffics showing positional and temporal fluctuations do not take into consideration, so that a code design made in consideration of severe conditions of the propagation path causes a transmission power loss in a place where the propagation path is in good conditions.

In this connection, the transmitting apparatus or the transmitting method relating to the second aspect of the present invention may further comprise propagation path condition monitoring means or a step of monitoring propagation path conditions such as traffic conditions at certain intervals, wherein the power amplification means or the step may also effect updating of the amplitude value of each code at any time by changing the number of considerable interference signals and/or the number of code words for one frame according to the propagation path conditions. Further, for more precise control of the amplitude value, it is also allowable to give a margin to the amplitude value. It is, however, noted that when a change of the number of code words for one frame was made, it is necessary to send update information on the number of code words to a receiver side. On the contrary, when changes of the number of considerable interference signals and the amplitude margin were merely made, there is no need to send any information to the receiver side.

The transmitting apparatus or the transmitting method relating to the second aspect of the present invention treats the received signals in such a way as to broadly classify into two categories, specifically, one including a desired signal and a considerable interference signal and the other including an unconsidered interference signal, according to the magnitude of the reception power. The "considerable interference signal" specified herein means a significantly primary interference signal in the received signals so as to have a great effect on the desired signal.

Intervals of the amplitude rate are made narrower by setting the limitation on the number of considerable interference signals, with the result that a transmission power is suppressible down to a lower level. In this case, it is, however, noted that a large number of undesired waves other than the considerable undesired waves are existent as a matter of fact. Thus, a power sum of the undesired waves having been not considered to be the considerable undesired waves is called a residual interference power. The residual interference power is attributable to an increase in the noise as judging from the receiver, leading to one of factors of degradation of a decoding performance.

By contrast, an increase in the number of considerable interference signals increases average transmission energy, while an increase in the number of code words for one frame decreases the average transmission energy. In this case, it is, however, noted that the increase in the number of code words causes the number of bits for one code to be made smaller, resulting in degradation of the decoding capability when turbo codes are in use.

Alternatively, the power amplification means or the step may be also to perform calculation of the amplitude value of each code by taking the residual interference power (composed of the power sum of undesired interference waves having been not considered to be the considerable undesired waves) into consideration. For instance, measures to allow the base station to collect information of an average residual interference power from each terminal may be taken to perform calculation of the amplitude value of each code in consideration of a value of collected average residual interference power. When the average residual interference power is of high level, a low-level code is supposed to be covered up by residual interference, resulting in inadaptability of decoding. Thus, the amplitude of the low-level code needs to be set larger. In this case, the amplitude of a high-level code is also made larger, so that measures to adjust the number of considerable interference signals, the number of codes for one frame and the amplitude margin or the like should be taken to maintain an average transmission power.

A third aspect of the present invention is to provide a receiving apparatus or a receiving method for receiving a transmitting signal obtained by a process of encoding each frame resulting from segmentation of transmission information, of power amplifying each encoded signal with a different amplitude and of interleaving all signals with each amplified signal collected into one, wherein the receiving apparatus or the receiving method comprises: de-interleaving means or a step of de-interleaving the above transmitting signal; decoding means or a step of sequentially decoding codes of the signal in descending order of SINR; and signal canceling means or a step of re-encoding the decoded signal to sequentially cancel the re-encoded signal from the above transmitting signal.

According to the receiving apparatus or the receiving method relating to the third aspect of the present invention, the desired wave may be separated from the undesired wave in such a way as to de-interleave by taking advantage of a difference in interleaving pattern used for the transmitting station side. The non-spread spectrum multi-cell system ensuring one-frequency reuse may be implemented using a different interleaving pattern for each cell. Also, the multiple-access is executable using a different interleaving pattern for each user.

Alternatively, it is also allowable to add a signal spreading process to the present system. It is, however, noted that the spreading specified herein is to reduce the power of the interference signal, and is not aimed principally at effecting user identification and separation, unlike the CDMA system.

As has been described in detail in the above, according to the present invention, it is possible to provide the communication system, the transmitting apparatus and the transmitting method, the receiving apparatus and the receiving method, the unbalance code mixing and the multiple code decoding method, which are of surpassing features to ensure that the increased capacity is attainable by implementing one-frequency reuse using the non-spread spectrum system. The present invention is effective in achieving user detection using the non-spread spectrum system, and is thus considered to be essentially different from the so-called CDMA system.

According to the present invention, the dispersion of the interference signal power is attainable, leading to the reduction thereof. Thus, in a case where the desired signal is equal in reception power to the interference signal, which case becomes an issue for the problem of the conventional inter-cell multi-user detection, decoding is executable by applying the present invention to the above case. Also, the reduction in the average transmission power is attainable by designing the amplitude of the power amplification unit in an appropriate manner.

Also, according to the present invention, an increased decoding performance with the average energy of a transmission symbol maintained is attainable by changing the amplitude value of the transmitting signal according to the propagation environment of the system.

Further, according to the present invention, it is possible to set freely the amplitude value of each code by changing the number of codes that provide different amplitude values and/or the number of considerable interference signals.

Furthermore, according to the present invention, an optimum system design is executable by changing the amplitude value of the transmitting code according to the cell disposition and congested hours and/or locations. In addition, a code design with the higher degree of freedom is also executable by providing the margin for the designed amplitude value of each code.

Furthermore, according to the present invention, the receiver may execute the decoding process without a need for any preliminary information in such a way as to design the amplitude value of each code by changing only the number of considerable interference signals and/or the amplitude margin without changing the number of codes that provide the different amplitude values.

Furthermore, according to the present invention, examination of the interference power of the whole system in advance is adaptable to establish an optimum parameter for determining the amplitude value of each code and thus makes contribution toward an increased decoding performance.

BRIEF DESCRIPTION OF THE DRAWINGS

The features and advantages of the present invention will become more apparent in the following description of the presently preferred embodiments of the invention taken in conjunction with the accompanying drawings, in which:

FIG. 8 is a graphical representation of a range of reception power adaptable to decoding when the number N of codes to be multiplexed is assumed to be 2;

FIG. 9 is a graphical representation of a range of reception power adaptable to decoding when the number N of codes to be multiplexed is assumed to be 4;

DETAILED DESCRIPTION OF PREFERRED EMBODIMENTS

Hereinafter, embodiments of the present invention will be described in detail with reference to the drawings.

A. First Embodiment

A-1. Transmission/Reception System

As a multi-cell wireless communication system such as a cellular system, a non-spread spectrum system that carries out a multiple access without using any spreading sequence (or effects no CDMA) is considered in this section. Specifically, the TDMA or the FDMA is applied to the multiple-access, and signals of users within the cell are in an orthogonal constellation.

Also, a modulation system of Orthogonal Frequency Division Multiplexing (OFDM) is adopted. The OFDM is a kind of multi-carrier transmission systems, and is to allow each carrier frequency to be set such that carriers are orthogonal to each other within a symbol interval. Further, the OFDM is effective in eliminating the influence of delayed waves and/or canceling interference with other users within the same cell by inserting a guard interval. Accordingly, the OFDM causes no in-cell interference.

In addition, the wireless communication system described below is assumed to be a system ensuring one-frequency reuse. Specifically, this wireless communication system allows adjacent cells to use the same frequency, and thus involves the occurrence of inter-cell interference. The present invention is to provide a technology for correctly decoding a desired signal by canceling the above inter-cell interference.

Figure 1:
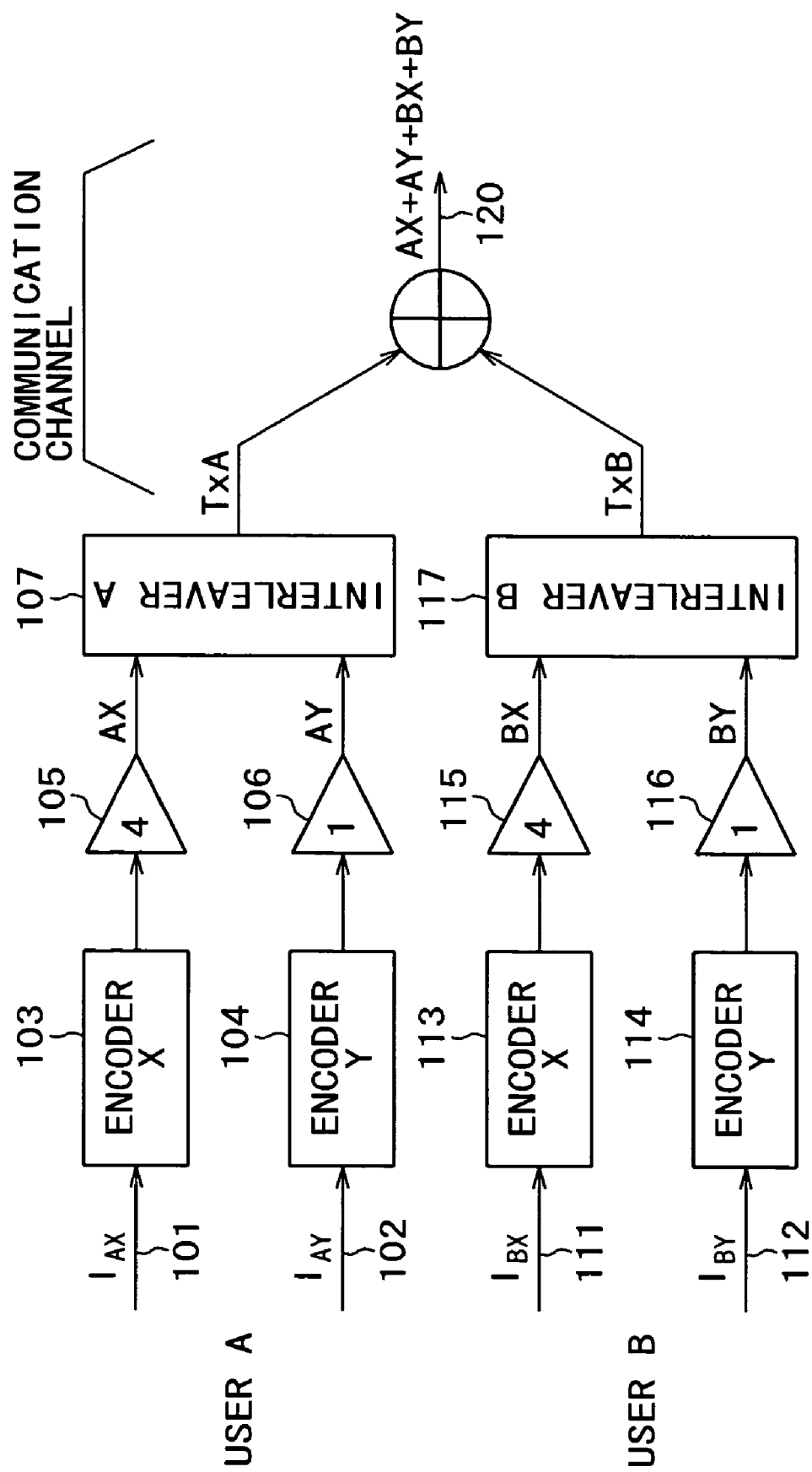
FIG. 1 is a schematic diagram showing a transmission model according to a first embodiment of the present invention.

FIG. 1 is a schematic diagram showing a transmission model according to a first embodiment of the present invention. The embodiment shown in FIG. 1 assumes that a certain transmitting station (or a user A) effects multiplexing of two codes into a transmitting signal to transmit over a propagation path, and that the transmitting signal is interfered with a signal from one of other stations (or a user B) in the propagation path. In the illustrated embodiment, a signal-to-power ratio is assumed to be 4:1.

A transmitter of the user A effects serial-to-parallel conversion of transmission information into signals $I_{AX}$ (101) and $I_{AY}$ (102), which are then encoded respectively with an encoder X (103) and an encoder Y (104). It is noted that the encoder X (103) may have the same configuration as the encoder Y (104).

The encoded signals are amplified respectively by power amplification units (105) and (106) having different amplitudes. The present embodiment assumes that each of the power amplification units (105) and (106) is an amplitude amplifier required for the digital signal processing, and is not a power amplifier.

The amplified signals AX and AY are merged through parallel-to-serial conversion, and are followed by random-interleaving over two code sections with an interleaver A (107). Thus, a signal TxA obtained by interleaving goes into a transmitting signal.

Likewise, a transmitter of the user B who is within a cell different from that of the user A effects serial-to-parallel conversion of transmission information into signals $I_{BX}$ (111) and $I_{BY}$ (112), which are then encoded respectively with an encoder X (113) and an encoder Y (114). Further, power amplification of the encoded signals are effected with power amplification units (115) and (116) having different amplitudes to obtain amplified signals BX and BY, which are then merged, and are followed by random-interleaving with an interleaver B (117), thereby providing an interleaved signal TxB as a transmitting signal.

It is noted that the encoder X (113) and the encoder Y (114) may be the same as those for the user A. Also, amplitude patterns of the power amplification units (115) and (116) are arbitrarily determined, and may be identical or not to those of the power amplification units for the user A. For the convenience of simplification, the present specification assumes that amplitude patterns of 4 and 1 are equally assigned to the power amplification units for each user.

It is, however, noted that an interleaving pattern is assumed to be unique at least within the neighboring cells interfered with other cells. The embodiment shown in FIG. 1 assumes that the interleaver A (107) and the interleaver B (117) are different in their interleaving patterns.

A non-spread spectrum multi-cell system ensuring one-frequency reuse may be implemented using the different interleaving pattern for each cell. Also, the multiple-access is executable using the different interleaving pattern for each user.

In a channel, the transmitting signals TxA and TxB respectively from the users A and B are summed up together into a signal AX+AY+BX+BY (120) as an interference signal.

Figure 2:
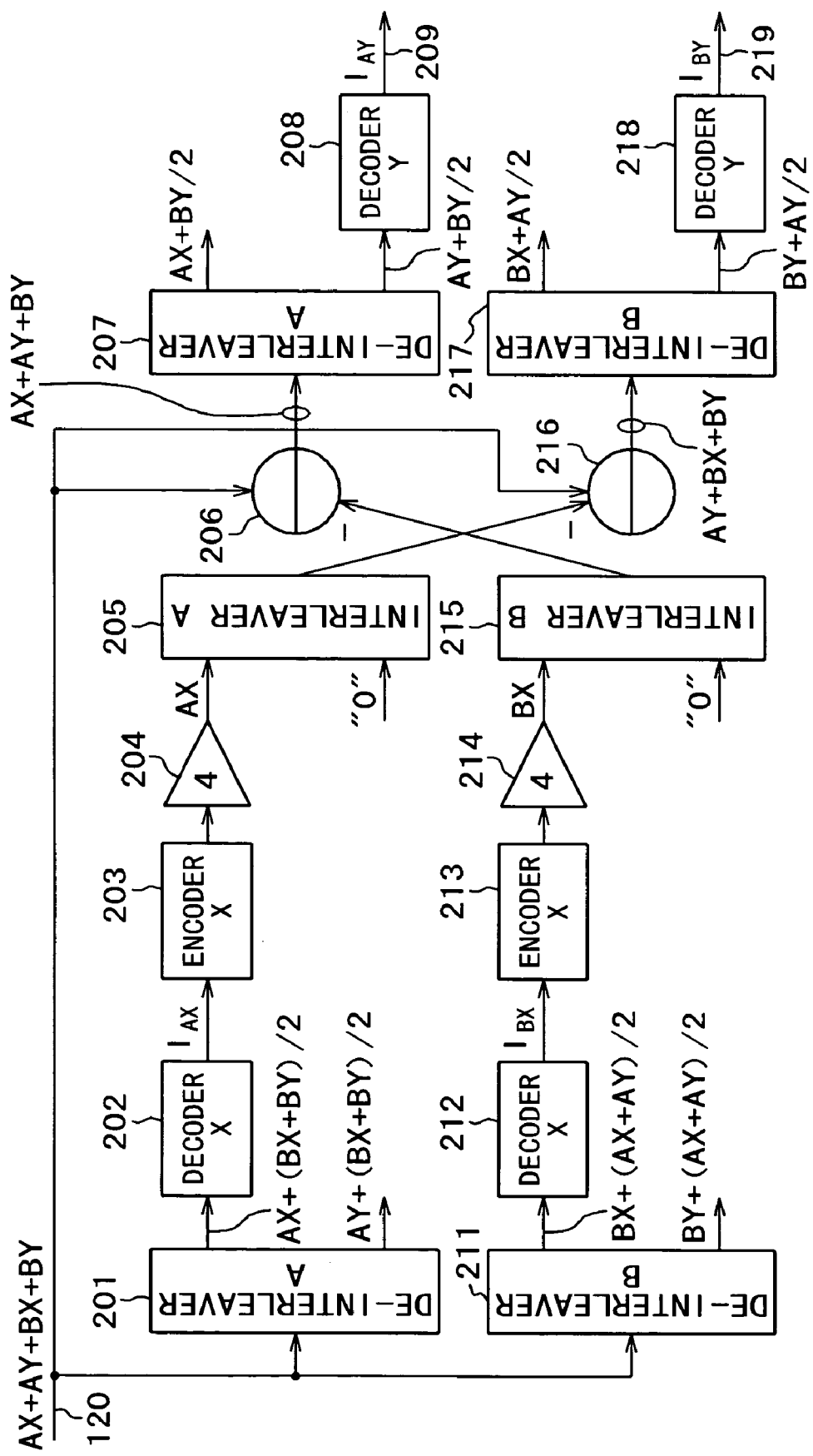
FIG. 2 is a schematic block diagram showing a configuration of a receiver according to the first embodiment of the present invention.

FIG. 2 is a schematic diagram showing a configuration of a reception model adaptable to the transmitter configuration shown in FIG. 1. As described in the following, a receiver as the reception model shown is effective in receiving a signal having suffered interference over the channel to ensure that separation and detection of each signal are executable. It is, however, noted that a signal component contains no noise item.

The transmitting signals from the users A and B are merged together to transmit to the receiver. The signal received by the receiver is the signal AX+AY+BX+BY (120) (Refer to FIG. 1).

First of all, the received signal (120) is de-interleaved with a de-interleaver A (201) of the user A. The present embodiment assumes that the interleaving pattern is unique at least within the neighboring cell interfered with the other cells. It is noted that there is no correlation in the interleaving pattern between the user A and the user B as described above. Thus, output of the de-interleaver A (201) results in AX+(BX+BY)/2, which means that interference components decrease to half.

Next, an output signal of the de-interleaver A (201) is supplied to a decoder X (202) for decoding. The decoder X (202) effects decoding of only a code X having the highest SINR (or the most probable code). If the reception power of a desired signal AX is substantially higher than the power of an interference signal (BX+BY)/2, decoding of the desired signal AX is executable correctly, thereby providing a decoded signal $I_{AX}$.

Now assuming that the signals from the users A and B were received with equal power, a power ratio of the desired signal AX to the interference signal (BX+BY)/2 becomes 4:2.5. Specifically, it means that the desired signal power is 1.6 times (2.0 dB) as much as the interference signal power. Thus, correct decoding is executable using a code such as a turbo code having a required Carrier-to-Interference power Ratio (CIR) of 2.0 dB or below as an original code.

Also, the received signal (120) is de-interleaved with a de-interleaver B (211) of the user B. There is no correlation in interleaving pattern between the user A and the user B, so that output of the de-interleaver B (211) results in BX+(AX+AY)/2, which means that interference components decrease to half.

Next, an output signal of the de-interleaver B (211) is supplied to a decoder X (212) for decoding. The decoder X (212) effects decoding of a code X that is a code having a highest SINR in the signal to be decoded. The reception power of a desired signal BX is sufficiently higher than the power of an interference signal (AX+AY)/2, so that a correctly decoded signal $I_{BX}$ is obtainable.

Next, components of the decoded signals $I_{AX}$ and $I_{BX}$ are canceled from the received signal.

The decoded signal $I_{AX}$ obtained by decoding with the decoder X (202) is re-encoded with an encoder X (203) and is followed by amplification with a power amplification unit (204). An interleaver A (205) carries out interleaving with the decoded signal AX inputted together with a signal whose components are all 0 as the other signal AY to be merged. The interleaver A (205) has the same configuration and also employs the same interleaving pattern as the transmitter-side interleaver A (107). The above interleaving results in generation of a replica of the transmitting signal having only the signal component AX from the user A, so that cancellation of the signal component AX from the received signal (120) is effected with a differential unit (216), thereby providing an output signal AY+BX+BY. Specifically, when the propagation path produces fluctuations such as phasing, multiplying a replica of the propagation path fluctuations is effected.

Likewise, the decoded signal $I_{BX}$ obtained by decoding with a decoder X (212) is re-encoded with an encoder X (213), and is followed by amplification with a power amplification unit (214). An interleaver B (215) carries out interleaving with the decoded signal BX inputted together with a signal whose components are all 0 as the other signal BY to be merged. The interleaver B (215) has the same configuration and also employs the same interleaving pattern as the transmitter-side interleaver B (117). The above interleaving results in generation of a replica of the transmitting signal having only the signal component BX from the user B, so that cancellation of the signal component AX from the received signal (120) is carried out with a differential unit (206), thereby providing an output signal AX+AY+BY.

Finally, decoding of the signals AY and BY of the second highest power level from each transmitter is effected. First of all, the output signal (AX+AY+BY) of the differential unit (206) is de-interleaved with a de-interleaver A (207) again.

The de-interleaver A (207) has the same configuration and also employs the same interleaving pattern as the de-interleaver A (201).

The output of the de-interleaver (207) results in AX+BY/2 and AY+BY/2, which mean that the power of the interference signal BY decreases to half. Next, the decoder Y (208) carries out decoding of a code Y having a higher SINR of the signal AY+BY/2. It is noted that if a difference between the reception power of the desired signal AY and the power of the interference signal BY/2 is sufficiently large, correct decoding of the desired signal AY is executable with the decoder Y (208), thereby providing a decoded signal $I_{AY}$.

Likewise, the output signal (AY+BX+BY) of a differential unit (216) is de-interleaved with a de-interleaver B (217) again. The de-interleaver B (217) has the same configuration and also employs the same interleaving pattern as the de-interleaver B (211).

The output of the de-interleaver B (217) results in BX+AY/2 and BY+AY/2, which mean that the power of the interference signal AY decreases to half. Next, a decoder Y (218) carries out decoding of a code Y having a higher SINR of the signal BY+AY/2. It is noted that if a difference between the reception power of the desired signal BY and the power of the interference signal AY/2 is sufficiently large, correct decoding of the desired signal BY is executable with the decoder Y (218), thereby providing a decoded signal $I_{BY}$.

With the above procedure, all the signals $I_{AX}$, $I_{AY}$, $I_{BX}$ and $I_{BY}$ having been transmitted from the users A and B are decoded.

While the above embodiment is configured so that decoding and cancellation of the signals in descending order of SINR are continuously performed with all the received signals of the users as input to the first stage de-interleaver A (201) and the first-stage de-interleaver B (211), the scope of the present invention is by no means limited to the above embodiment. Alternatively, iterative decoding is also applicable to increase a decoding accuracy, for instance. A procedure of the iterative decoding is described in the following.

First of all, decoding of AX is carries out, and cancellation of AX from the received signal AX+AY+BX+BY with the differential unit (216) follows, thereby providing the signal AY+BX+BY.

Next, the signal obtained by cancellation of AX to the de-interleaver B (211) for the user B is inputted, thereby providing the signal BX+AY/2. This signal BX+AY/2 is a signal resulting from cancellation of the interference component AX, so that decoding of BX is effected with increased accuracy.

Likewise, BX is decoded, and cancellation of BX from the received signal AX+AY+BX+BY with the differential unit follows, thereby providing the signal AX+AY+BY. Then, this signal AX+AY+BY to the de-interleaver A (201) for the user A is inputted, thereby providing the signal AY+BY/2. This signal AY+BY/2 is a signal resulting from cancellation of the interference component BX, so that decoding of AX is effected with increased accuracy.

As described above, the iterative decoding is executable over the users in such a way as to offer the decoding result of each user to the users each other, specifically, the decoding result of one user to the other user as input therefor.

In addition, the iterative decoding is also applicable to inter-code decoding of codes of different stages (such as codes amplified with the power amplification units having different amplitudes). In the embodiment shown in FIG. 2, a decoding process is completed in such a way as to effect decoding in order of AX and AY. Decoding of BX and BY is executable by adapting, to input to the first-stage de-interleaver (211) for the user B, signal components obtained by canceling AX and AY from the received signal (120) after re-encoding of the decoded signal $I_{AY}$ obtained by the above decoding process into AX and AY.

A-2. How to Set Amplitudes of the Power Amplification Unit

The code multiplexing system in Inter-Cell Multi-User Detection (IC-MUD) having been described with reference to FIGS. 1 and 2 is herein called Unbalance Code Mixing (UCM). The IC-MUD is one of approaches to implementation of one-frequency reuse by effecting detection, decoding and cancellation of co-cell interference in a system of in-cell orthogonal arrangement of the FDMA or TDMA. The UCM is also a code multiplication/interference cancellation method for simultaneously decoding a plurality of signals received with equal power.

Figure 3:
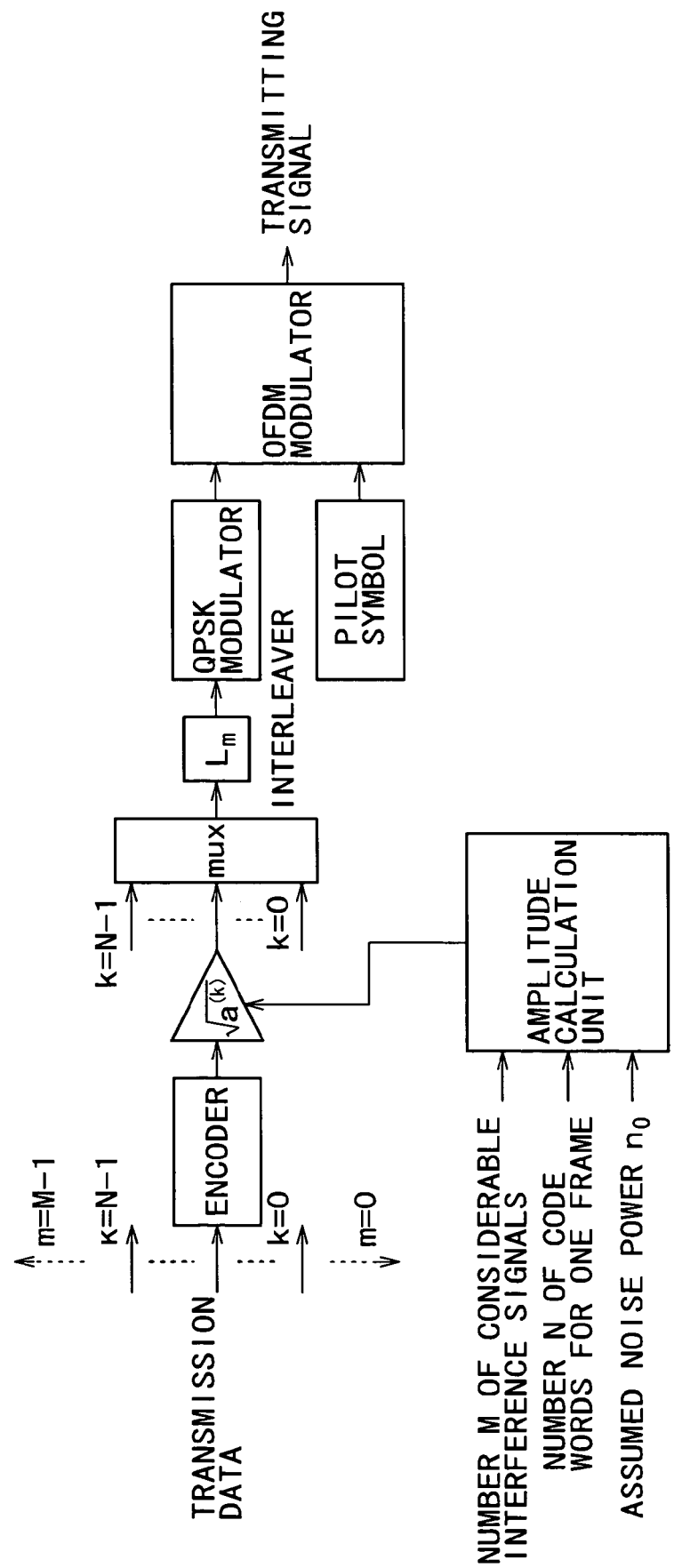
FIG. 3 a schematic diagram showing a transmitter configuration of UCM (Unbalance code mixing) according to the first embodiment of the present invention.

FIG. 3 is a schematic diagram showing a transmitter configuration of the UCM. Referring to FIG. 3, assume that M is the number of users (or the number of interference signals), and N is the number of codes to be multiplexed with the UCM (or the number of code words for one frame). It is noted that the cell is in an in-cell orthogonal arrangement and thus causes no interference, so that all the users are assumed to be in different cells, for the convenience of simplification of the following description.

Transmission data is subjected to serial-to-parallel conversion, and is then encoded with the encoder. The encoded transmission data is multiplied by the amplitude determined for each code word in the power amplification unit, and is followed by time multiplication with a multiplexer MUX.

The power amplification unit multiplies the k-th code word by an amplitude value $\sqrt{a^{(k)}}$ (provided that 0<k<N−1). An amplitude calculation part performs calculation of the amplitude value from the number of interference signals, the number of code words for one frame and noise power.

Then, the transmission data is interleaved over N pieces of codes successively with an interleaver $L_m$, is then subjected to QPSK modulation, for instance, and is followed by OFDM modulation together with a pilot symbol into a transmitting signal. In FIG. 3, there is shown an embodiment using Quadrature Phase Shift Keying (QPSK) as a modulation method. It is noted that random interleaving having a different pattern for each cell is adapted to the above interleaving. Also, the pilot symbol is assumed to be a unique orthogonal code for each cell.

In the present embodiment, the amplitude value is calculated from the number of interference signals, the number of code words for one frame and the noise power as described above. While the above description is given on the assumption that the power ratio of the power amplification unit is 4:1, a specific method for designing the power ratio, specifically, the amplitude value of each code is described in the following.

The amplitude value of each code adaptable to decoding of all the signals is calculated. The transmitter sets up N pieces of codes of required SNR, that is, $E_{rs}/(n_0/2)=\rho$. It is noted that $E_{rs}$ represents signal energy for one real number, and $n_0$ is power spectrum density at the opposite sides of noise. After the energy for one real number of the k-th code $C^{(k)}$ is defined as $E_{rs}^{(k)}$ ($E_{rs}^{(k)}>E_{rs}^{(m)}$, k>m), interleaving over the N pieces of codes for transmission is effected. Assume that a receiving end has received the signals of M users (M being the number of users) with the equal level of reception power.

It is noted that the cell is in the in-cell orthogonal arrangement, so that interference is supposed to be caused by other cells. Also, assume that dispersion of noise added per one real number is $n_0/2=\sigma_n^2$. At this time, assuming that cancellation of all codes from $C^{(N-1)}$ to $C^{(k+1)}$ of the transmitter was achieved after decoding thereof, the requirements adaptable to decoding of $C^{(k)}$ are given by the following expression.

$$E_s^{(k)} > \rho \left( \sigma_n^2 + \frac{M-1}{N} \sum_{j=0}^{k} E_s^{(j)} \right) \quad (1)$$

Figure 4:
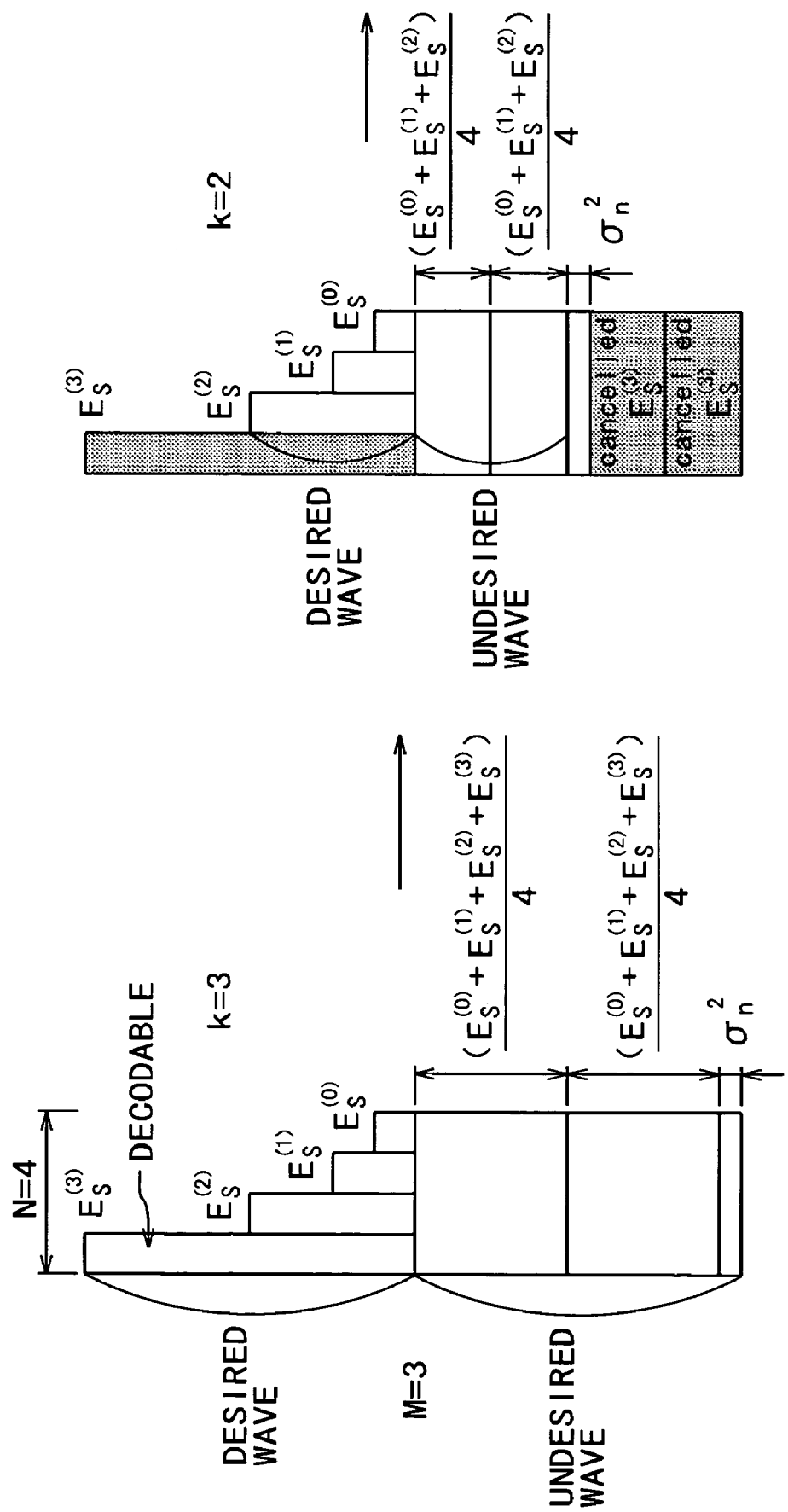
FIG. 4 is a schematic diagram showing a process of decoding.

FIG. 4 shows a process of the above decoding. In FIG. 4, assume that the number N of codes to be multiplexed for each user is 4, and the number M of users equal in reception power is 3. It is noted that the illustrated embodiment assumes that the interference signal includes no interference signal whose reception power is other than the above equal reception power.

A left section of FIG. 4 shows energy per symbol for each user when de-interleaving of a certain desired wave was carried out. The undesired wave is different from the desired wave in random interleaving pattern, so that certain interference signal energy applied to the desired signal having been de-interleaved results in an average of energies of the codes of all the levels. The number of undesired signals is M−1, so that whole interference energy is obtained by multiplying the above energy by M−1. Thus, energy of $E_{rs}^{(k)}$ is determined according to the above expression.

When reception of all the codes with the energy satisfying the above decoding requirements is attained, all the user's codes $C^{(3)}$ having the energy of $E_{rs}^{(3)}$ are decoded. At this time, each code energy at a time when cancellation of all the user's codes $C^{(3)}$ is completed is obtained as shown in a right section of FIG. 4.

It is noted that each of portions described in a hatching manner represents cancelled signal energy. It may be found that cancellation of the code $C^{(3)}$ of the interference signal results in a decrease of the energy of the interference signal. Thus, decoding of a code $C^{(2)}$ having the energy of $E_{rs}^{(2)}$ is next executable. In this manner, sequential decoding of the codes in descending order of SINR is carried out.

The minimum $E_{rs}^{(k)}$ adaptable to decoding of all the codes is calculated by solving a recurrence formula with the above expression (1) changed to have the equality sign, and may be given by the following expression (2). The amplitude value $a^{(k)}$ to be multiplied by the k-th code word is in proportion to $E_{rs}^{(k)}$.

$$E_s^{(k)} = \rho \sigma_n^2 \left( \frac{1}{1 - \rho(M-1)/N} \right)^{k+1} \quad (2)$$

Figure 5:
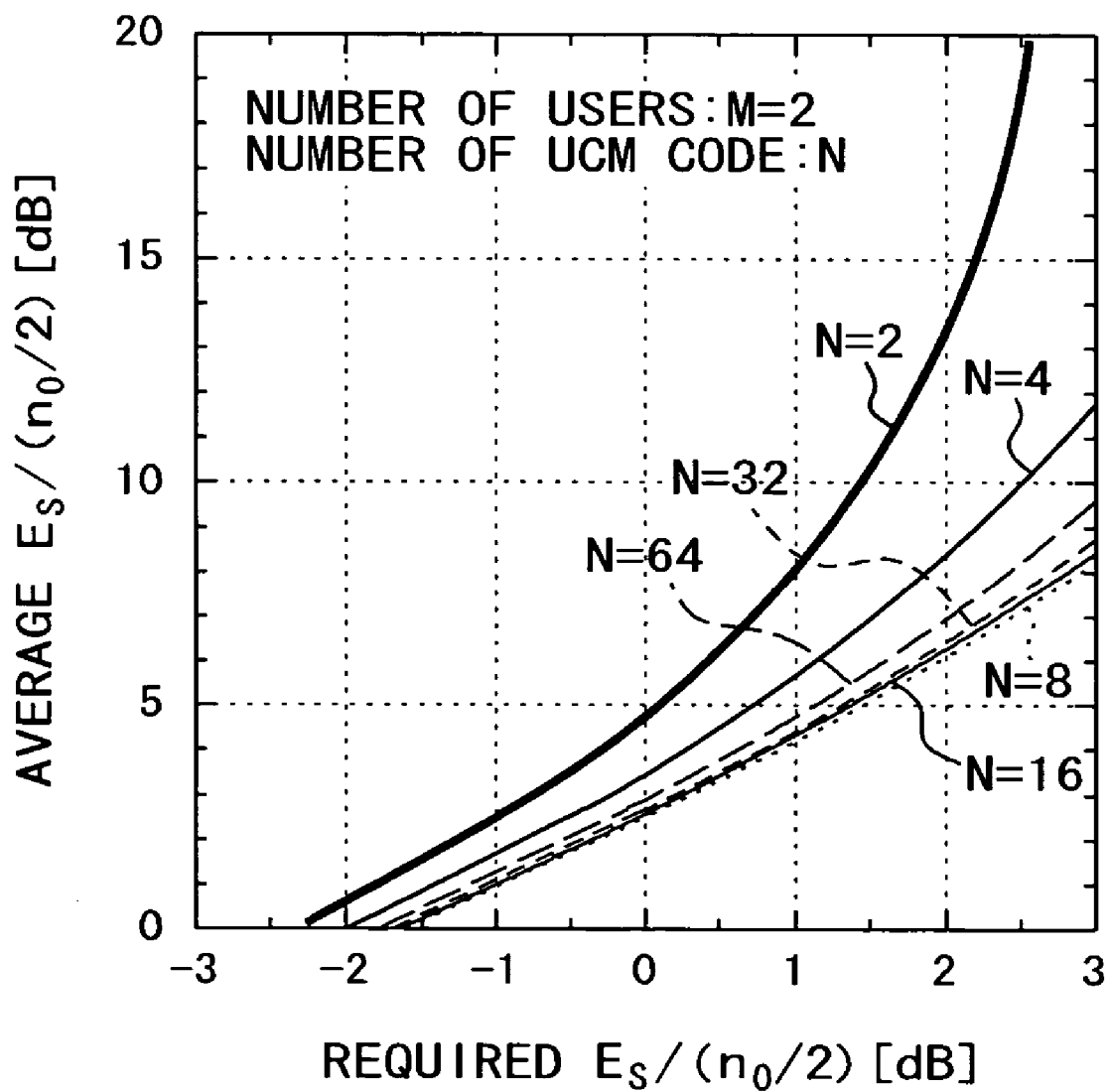
FIG. 5 is a graphical representation of the minimum of an average $E_{rs}/(n_0/2)$ adaptable to decoding with respect to a required $E_{rs}/(n_0/2)$ of an original code when the number M of users is assumed to be 2.

On the assumption that the number M of users is 2, the worst case where both the users are equal in reception power is considered (since higher reception power of the interference signal enables the interference signal to be decoded more easily). FIG. 5 shows the minimum of average $E_{rs}/(n_0/2)$ adaptable to decoding with respect to required $E_{rs}/(n_0/2)$ of an original code. The greater the number N of codes to be multiplexed is, the smaller the average $E_{rs}/(n_0/2)$ is, while a substantially convergence of the above minimum is attained when N=16.

Figure 6:
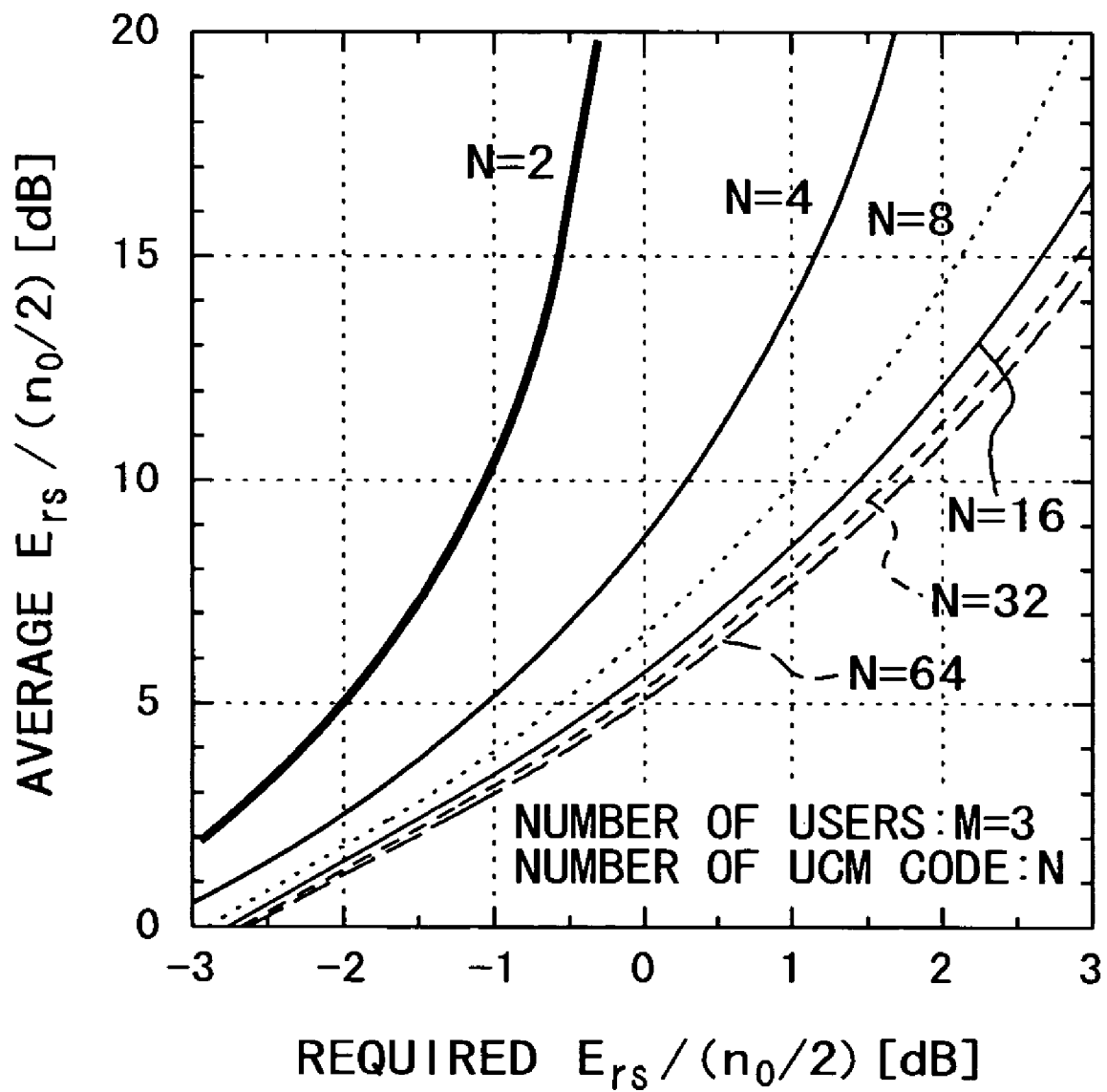
FIG. 6 is a graphical representation of the average $E_{rs}/(n_0/2)$ when the number M of users is assumed to be 3.

FIG. 6 shows average $E_{rs}/(n_0/2)$ when the number M of users is assumed to be 3. FIG. 6 also takes into account a case where all the users are equal in reception power. It is found that higher average $E_{rs}/(n_0/2)$ is required as compared with the case where the number M of users is 2.

A-3. Range of Reception Power Adaptable to Decoding

A range of reception power adaptable to decoding of each code is described in the following according to the above-mentioned transmitting signal designing method.

Assume that the number M of users is 2, the required $E_{rs}/(n_0/2)=\rho$ of the original code is 1.0 (0 [dB]), and $n_0/2$ is 1.0 (0 [dB]). FIGS. 7 to 10 show the range of reception power adaptable to decoding when the number of codes N is assumed to be 1, 2, 4 and 8, respectively. It is, however, noted that in FIGS. 7 to 10, values scaled at a vertical axis represent average $E_{rs}/(n_0/2)$ [dB] of a desired user and values scaled at a horizontal axis represent average $E_{rs}/(n_0/2)$ of an undesired user. Also, a power ratio range having been not adaptable to decoding is plotted in FIGS. 7 to 10 with the number N of codes as parameters. The number of different plotting patterns represents N pieces of codes.

Figure 7:
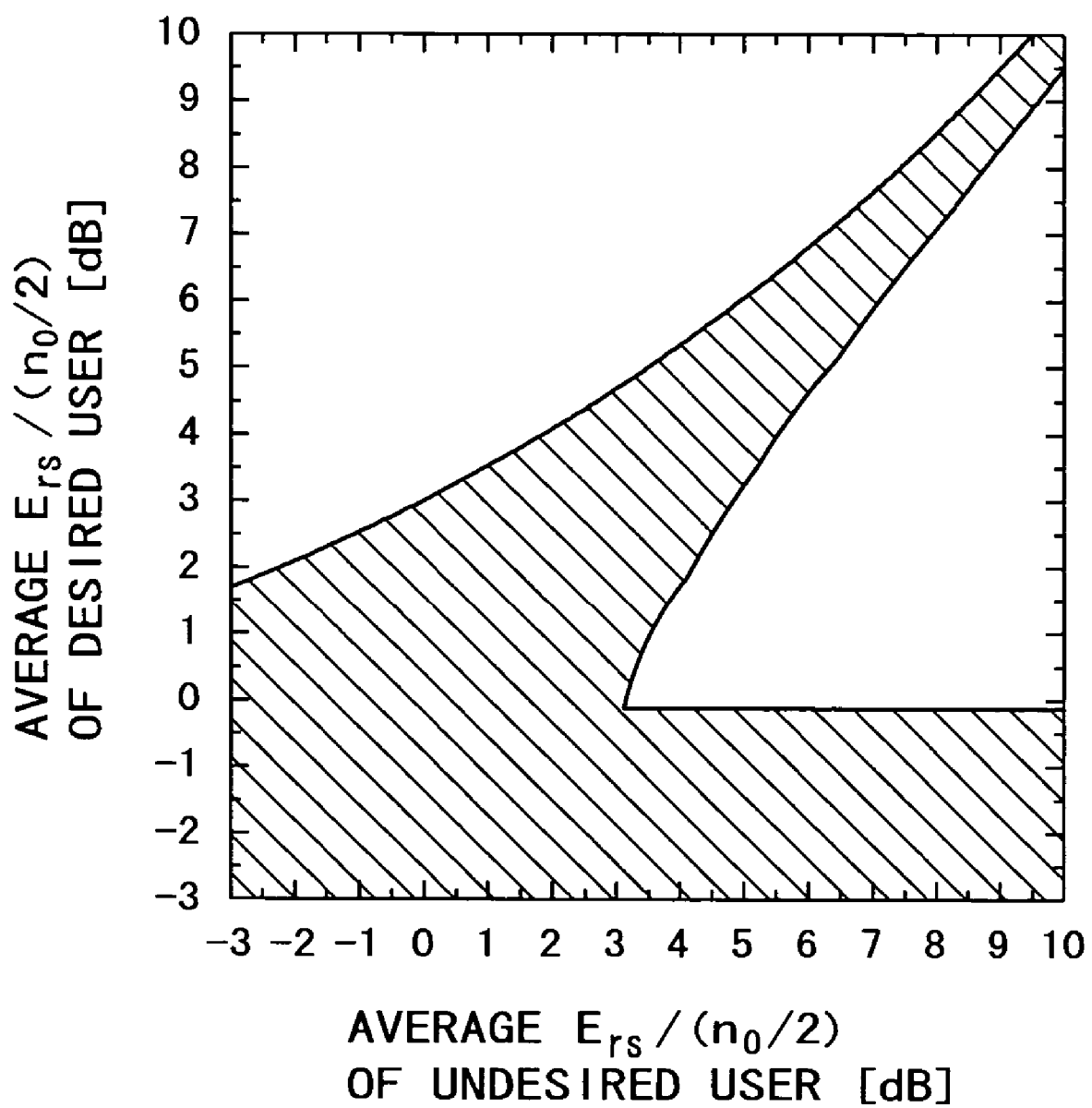
FIG. 7 is a graphical representation of a range of reception power adaptable to decoding when the number N of codes to be multiplexed is assumed to be 1.
Figure 10:
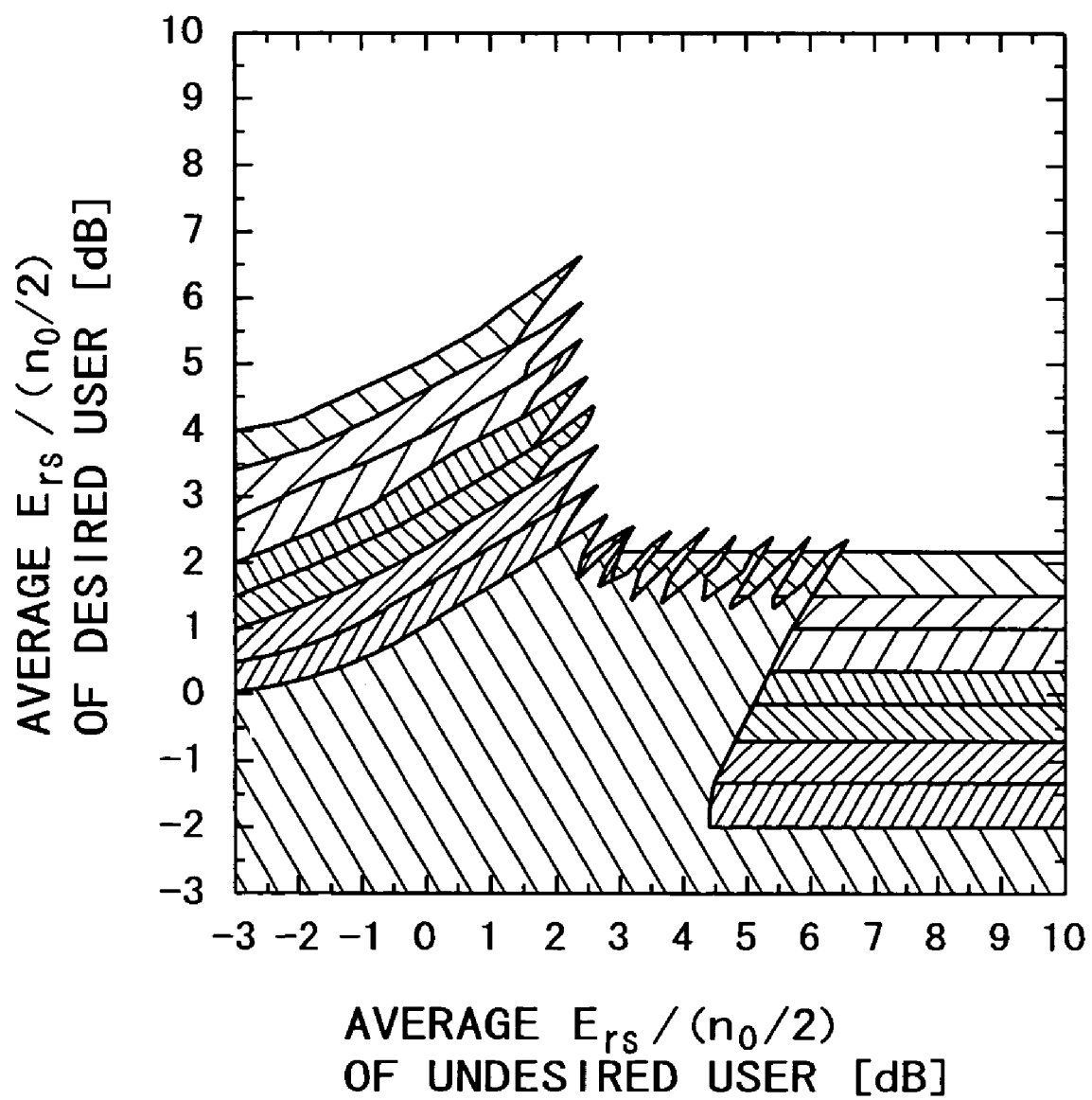
FIG. 10 is a graphical representation of a range of reception power adaptable to decoding when the number N of codes to be multiplexed is assumed to be 8.

When N=1, specifically, the present invention is not applied, a small difference in reception power between the desired user and the undesired user as shown in FIG. 7 results in inadaptability of decoding even if the reception power of the desired signal is sufficiently high. By contrast, it may be found from FIGS. 8 to 10 that using the present invention with the number N of codes increased to more than one enables decoding to be executed as long as reception power is sufficiently high even if the desired user is equal in reception power to the undesired user. Specifically, an increase in the number of codes to be multiplexed increases a range adaptable to reception and thus makes contributes toward an increased decoding capability.

A-4. Instance of Bit Error Rate Characteristics

Results of a computer simulation using the power amplification unit whose amplitude value is obtained by designing according to the above designing method are described in the following. It is noted that the following assumptions are employed in this section.

(i) AWGN (Additive White Gaussian Noise) channel is used for the propagation path.
(ii) SINR of each code of the received signal is known.
(iii) Reception timings of users agree with each other.
(iv) Reception powers of users are equal (specifically, the worst conditions for multi-user detection).

In the above simulation, a turbo code using a permutator of 3rd Generation Partnership Project (3GPP) is used for the original code. Also, the number of information bits for one code is 3456 bits, an encoding rate R is 1/2 and the number of times of iteration is 20.

Figure 11:
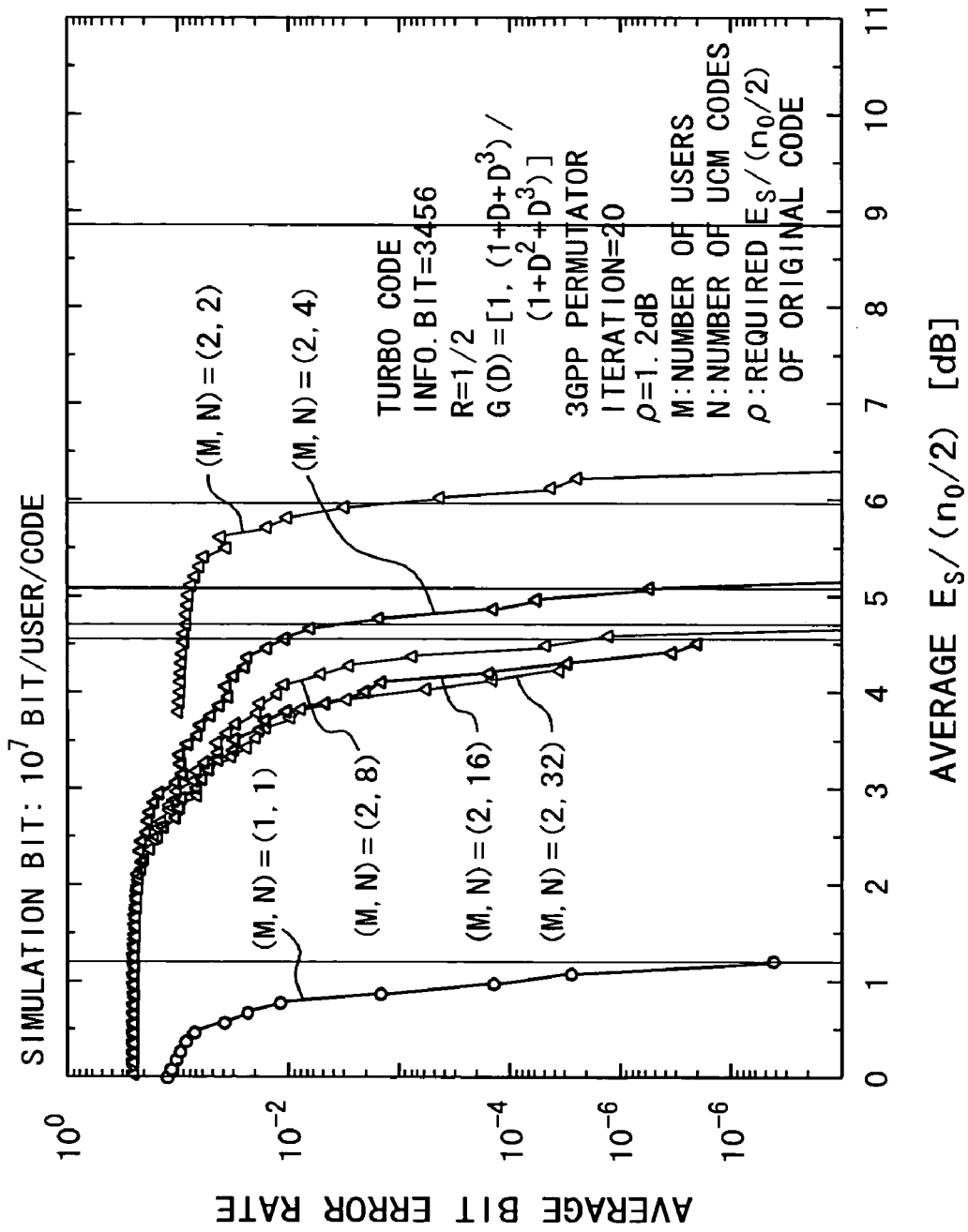
FIG. 11 is a graphical representation of characteristics of an average bit error rate when the number of undesired users is assumed to be 1.

FIG. 11 shows average bit error rate characteristics when the number M of users equal in reception power is assumed to be 2, specifically, the number of undesired users is assumed to be 1. In FIG. 11, values scaled at a horizontal axis represent average $E_{rs}/(n_0/2)$ of the desired signal, and values scaled at a vertical axis represent an average bit error rate of all the codes for all the users. It is noted that the number of simulation bits is 10 M bits per code for one user. Also, this simulation takes interference signal information into consideration in the process of turbo code decoding, and also performs calculation of likelihood using likelihood information of the code obtained by decoding in the former stage.

For comparison, FIG. 11 also shows bit error rate characteristics of the original code ((M, N)=(1,1) in FIG. 11). Assuming that the required $E_{rs}/(n_0/2)$ ($=\rho$) is a value having a bit error rate smaller than $10^{-6}$, it may be found from FIG. 11 that $\rho=1.2$ dB is attained. Calculation of the energy per symbol for each code was performed using this value according to the above expression (2).

The intervals of the energy of each code may be made closer as the number N of codes to be multiplexed is increased. Accordingly, the average $E_{rs}/(n_0/2)$ required for correct transmission is reduced. Also, broken lines in FIG. 11 represent calculated average $E_{rs}/(n_0/2)$. The reason why the simulation value is higher than this calculated value is because decoding of the turbo code is effected using the likelihood information of the code in the former stage to provide an increased decoding accuracy.

B. Second Embodiment

While the above first embodiment is configured so that the rate of amplitude amplification for each frame is changed according to the decoding capability in the receiving station side, the amplitude value is calculated from the number of interference signals, the noise power and the number of codes having different amplitude values, for instance. It is noted that the reception power of the interference signal varies, so that the interference power is set to the worst value. Then, calculation of the amplitude value of each code is performed on the assumption that the undesired wave is equal in reception power to the desired wave.

However, it is seldom in the actual propagation path that the power of the plurality of undesired waves is all equal to that of the desired wave, resulting in a problem of causing a transmission power loss in the greater part of the propagation path conditions. Also, the cell disposition conditions and/or traffics showing positional and temporal fluctuations do not take into consideration, so that code design made in consideration of the severe conditions of the propagation path causes a transmission power loss in a place where the propagation path is in good conditions.

An actual cellular system is by no means limited in cell disposition to standardized methods, and produces fluctuations in congested conditions of the traffics depending on locations and/or hours. In this connection, a second embodiment of the present invention is configured so that updating of the amplitude value of each code is carried out according to the calculation with the above expression (2) by monitoring the conditions such as traffic conditions at certain intervals to change the number of primary interference signals and/or the number of code words for one frame according to the above conditions.

It is, however, noted that when a change of the number of code words for one frame was made, it is necessary to send update information on the number of code words to the receiver side. By contrast, when changes of the number of considerable interference signals and an amplitude margin were only made, there is particularly no need to send any information to the receiver side (how to adjust the amplitude margin will be described later).

Figure 12:
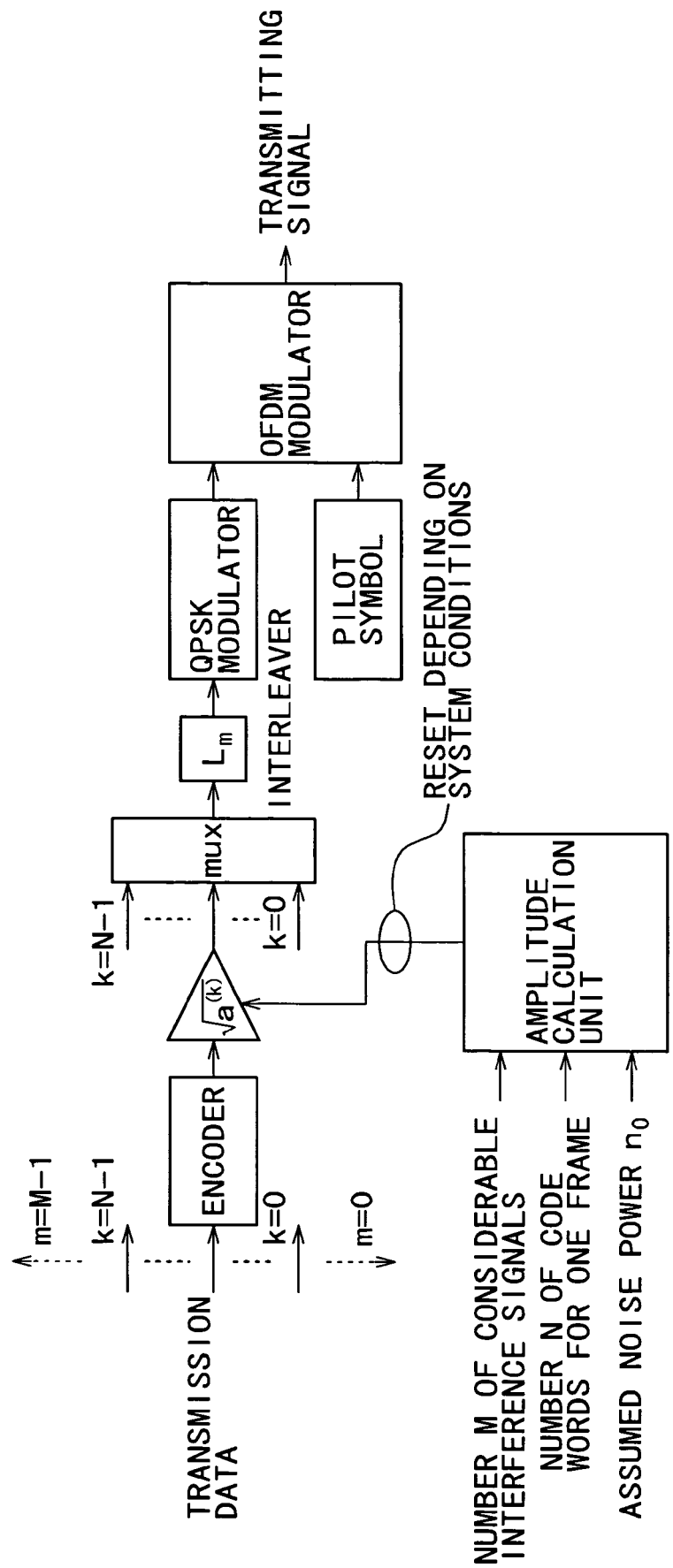
FIG. 12 is a schematic diagram showing a transmitter configuration of the UCM according to a second embodiment of the present invention.

FIG. 12 is a schematic diagram showing a transmitter configuration of the UCM according to the second embodiment of the present invention. In FIG. 12, assume that M is the number of users (the number of interference signals), and N is the number of codes to be multiplexed with the UCM (the number of code words for one frame). It is noted that the cell is in the in-cell orthogonal arrangement and thus causes no interference, so that all the users are assumed to be in different cells, for the convenience of simplification of the following description.

Transmission data is subjected to serial-to-parallel conversion, and is then encoded with an encoder. The encoded transmission data is then multiplied by the amplitude determined for each code word in the power amplification unit, and is followed by time multiplexing with a multiplexer MUX.

The power amplification unit multiplies the k-th code word by an amplitude value $\sqrt{a^{(k)}}$ (provided that $0<k<N-1$). An amplitude calculation part performs calculation of the amplitude value from the number of considerable interference signals, the number of code words for one frame and the noise power.

Then, the transmission data is interleaved over N pieces of codes successively with an interleaver $L_m$, is then subjected to QPSK (Quadrature Phase Shift Keying) modulation and is followed by OFDM modulation together with a pilot symbol, thereby providing a transmitting signal. In FIG. 12, there is shown an embodiment using QPSK is used as a modulation method. It is noted that random interleaving having a different pattern for each cell is adapted to the above interleaving. Also, the pilot symbol is assumed to be a unique orthogonal code for each cell.

In the second embodiment, the amplitude value is calculated from the number of considerable interference signals, the number of code words for one frame and the noise power. The second embodiment treats the received signals in such a way as to broadly classify into two categories, specifically, one including a desired signal and a considerable interference signal and the other including an unconsidered interference signal, according to the magnitude of the reception power. The "considerable interference signal" specified herein means a significantly primary interference signal in the received signals so as to have a great effect on the desired signal.

Figure 13:
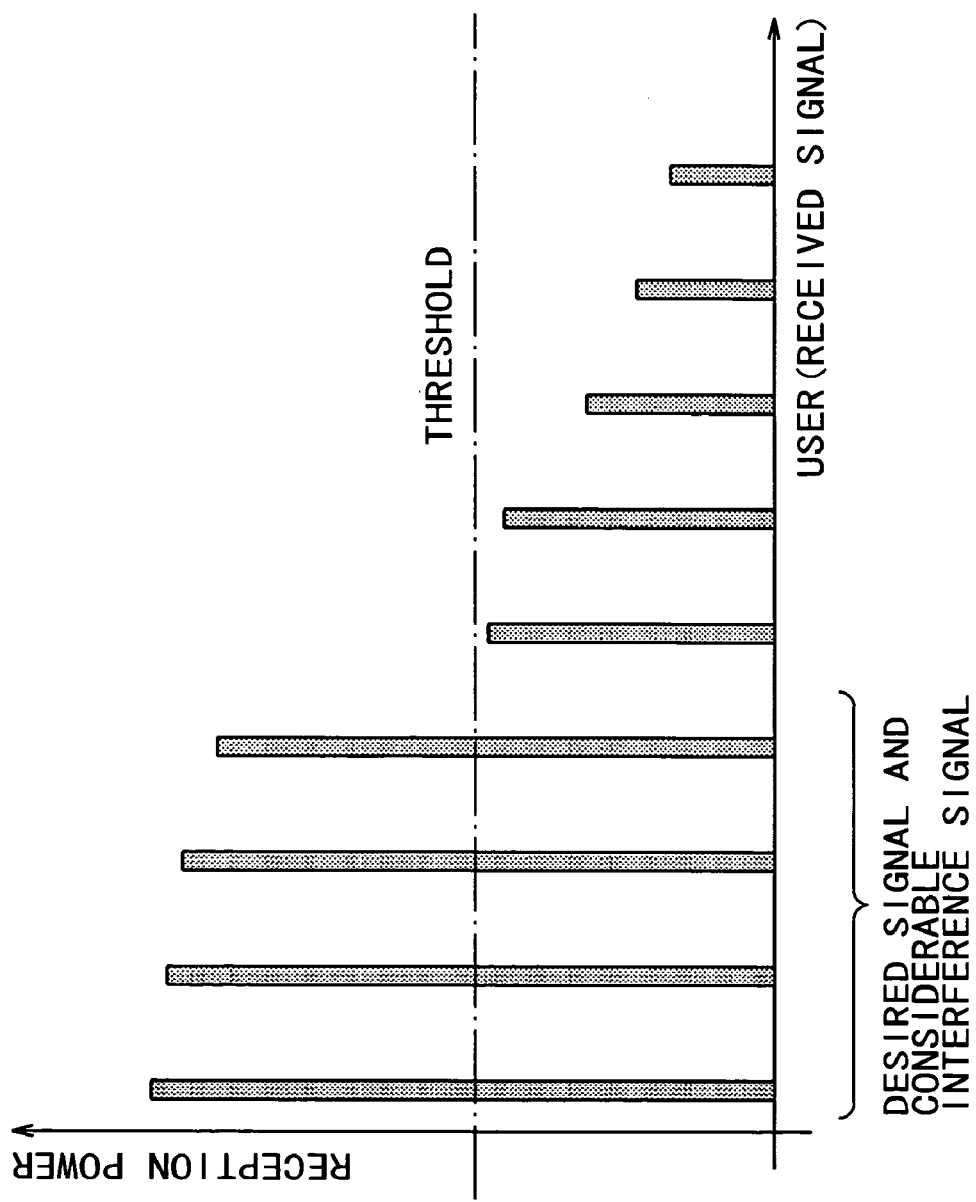
FIG. 13 is a graphical representation of a process of determining the number of considerable interference signals.

FIG. 13 shows the received signals including the desired signals and all the interference signals in order of the magnitude of reception power. In calculation of the amplitude value, only the interference signals exceeding a given threshold are treated as the considerable interference signal. The intervals of the amplitude ratio are made narrower by setting the limitation on the number of considerable interference signals, with the result that the transmission power is suppressible down to a lower level. In this case, it is, however, noted that a large number of undesired waves other than the considerable undesired waves are existent as a matter of fact. Now, assume that a power sum of undesired waves having been not considered to be the considerable undesired waves is called a "residual interference power". The residual interference power is attributable to an increase in the noise as judging from the receiver, leading to one of factors of degradation of the decoding performance.

An increase in the number of considerable interference signals increases average transmission energy. By contrast, an increase in the number of code words for one frame decreases the average transmission energy. It is, however, noted that the increase in the number of code words causes the number of bits for one code to be made smaller, resulting in degradation of the decoding capability when the turbo codes are in use.

Figure 14:
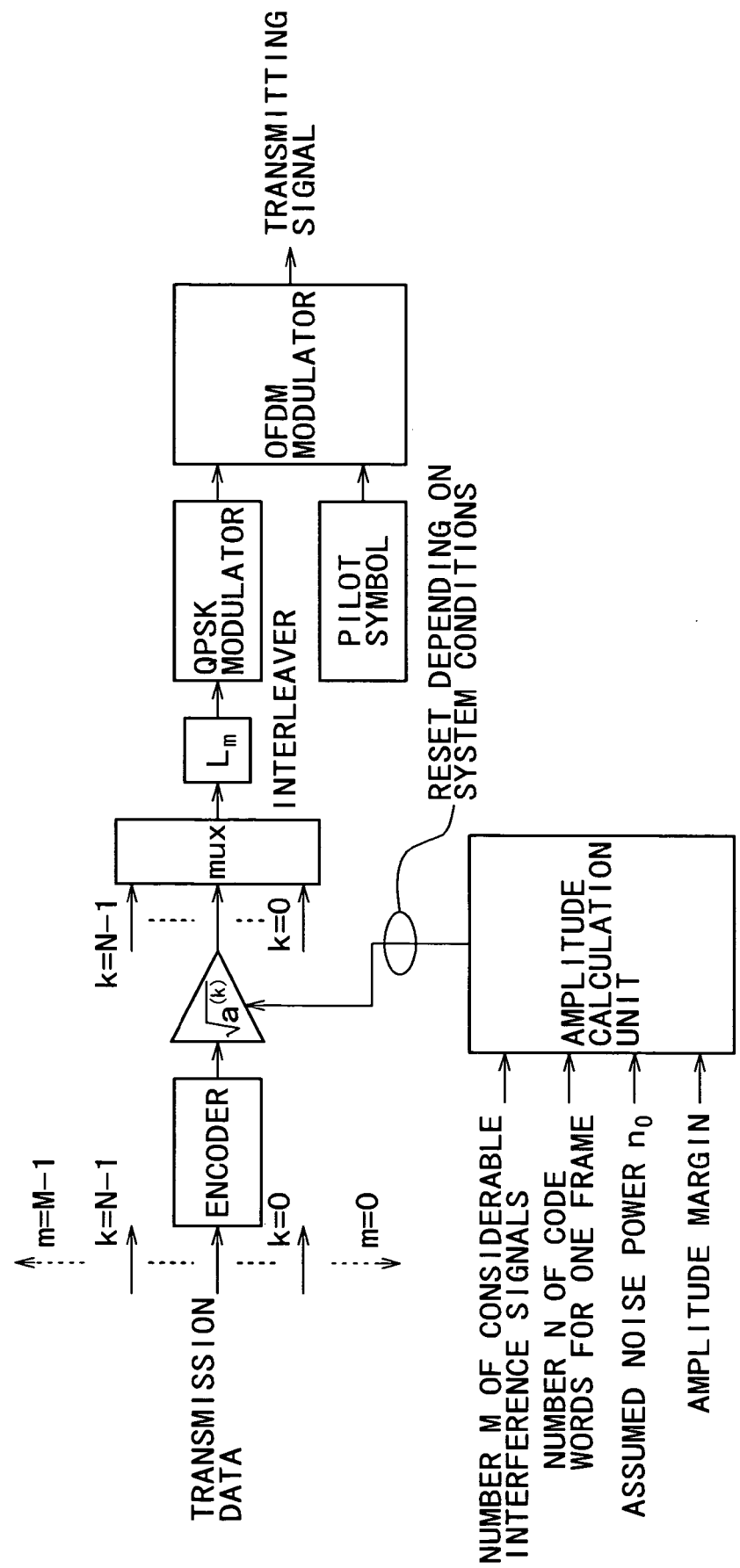
FIG. 14 is a schematic diagram showing a modification of the transmitter configuration shown in FIG. 12.

Alternatively, it is also allowable to give the margin to the amplitude value for finer control of the amplitude value. FIG. 14 shows a modification of the transmitter shown in FIG. 12. In the configuration shown in FIG. 12, the amplitude calculation unit performs calculation of the amplitude value from the number of considerable interference signals, the number of code words for one frame and the noise power. By contrast, an amplitude calculation unit in the modification of FIG. 14 is to perform calculation further with the margin given to the amplitude value.

Figure 15:
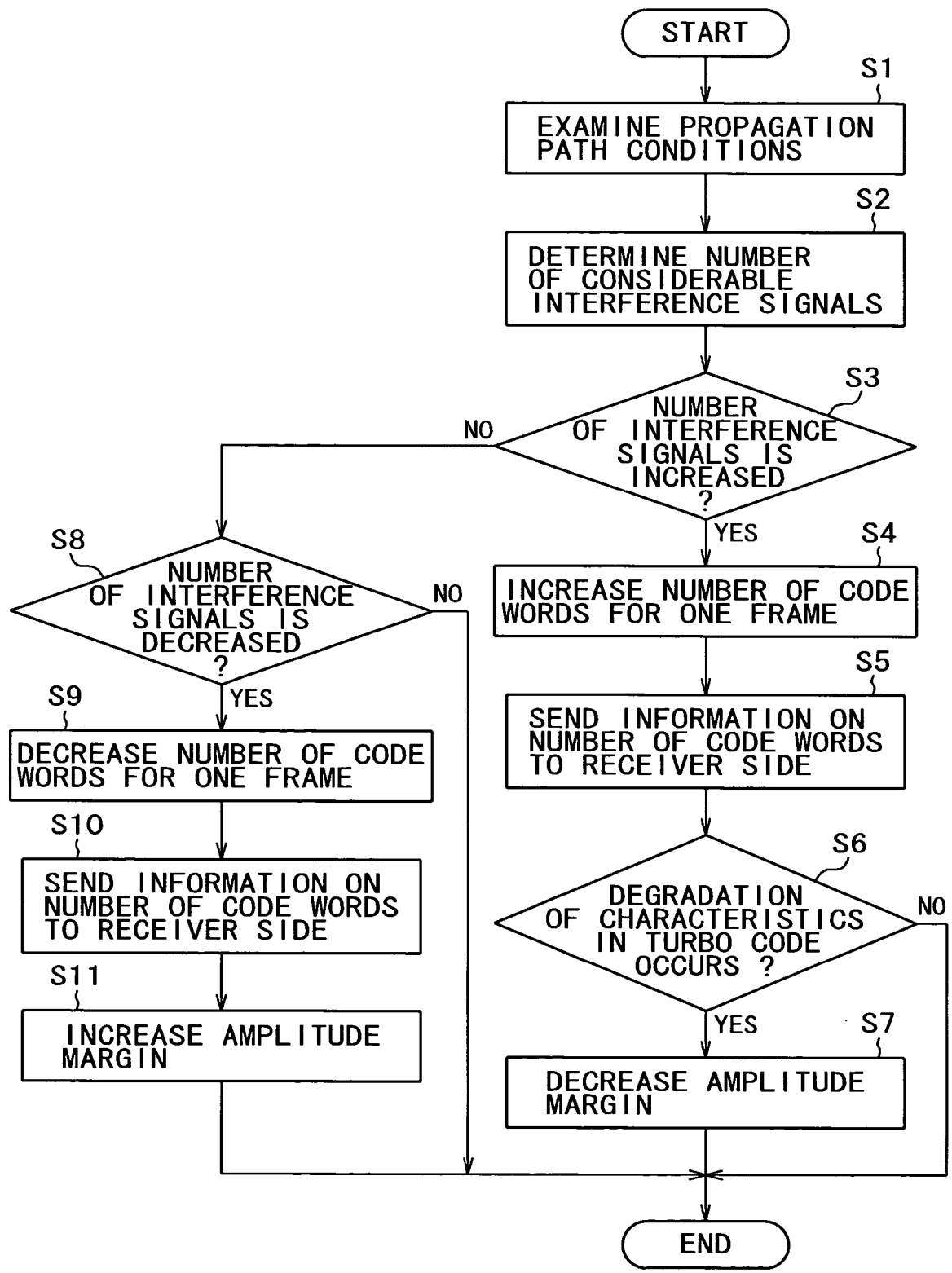
FIG. 15 is a flowchart showing a method for updating an amplitude value when an increase in the number of interference signals causes degradation of a decoding performance.

A method for updating the amplitude value in a case where the increase in the number of interference signals causes degradation of the decoding performance is described in the following with reference to a flowchart of FIG. 15.

First of all, examination of the propagation path conditions is made (the propagation path is being estimated at all times in decoding) (Step S1) to determine the number of considerable interference signals (Step S2).

The increase in the number of interference signals (Step S3) increases the average energy, so that the number of code words for one frame is increased (Step S4) to suppress the increase in the average energy. It is, however, noted that the change of the number of code words for one frame was made, update information of the number of code words is sent to the receiver side (Step S5).

An excessive increase in the number of code words leads to degradation of the characteristics for the turbo codes (Step S6). Thus, the amplitude margin is decreased (to make a difference in amplitude value between the code words smaller) (Step S7) to prevent the average energy from being increased.

By contrast, when the number of interference signals is decreased (Step S8), the number of codes for one frame may be decreased (Steps S9 and S10) or the amplitude margin may be increased to update the amplitude value (Step S11).

Figure 16:
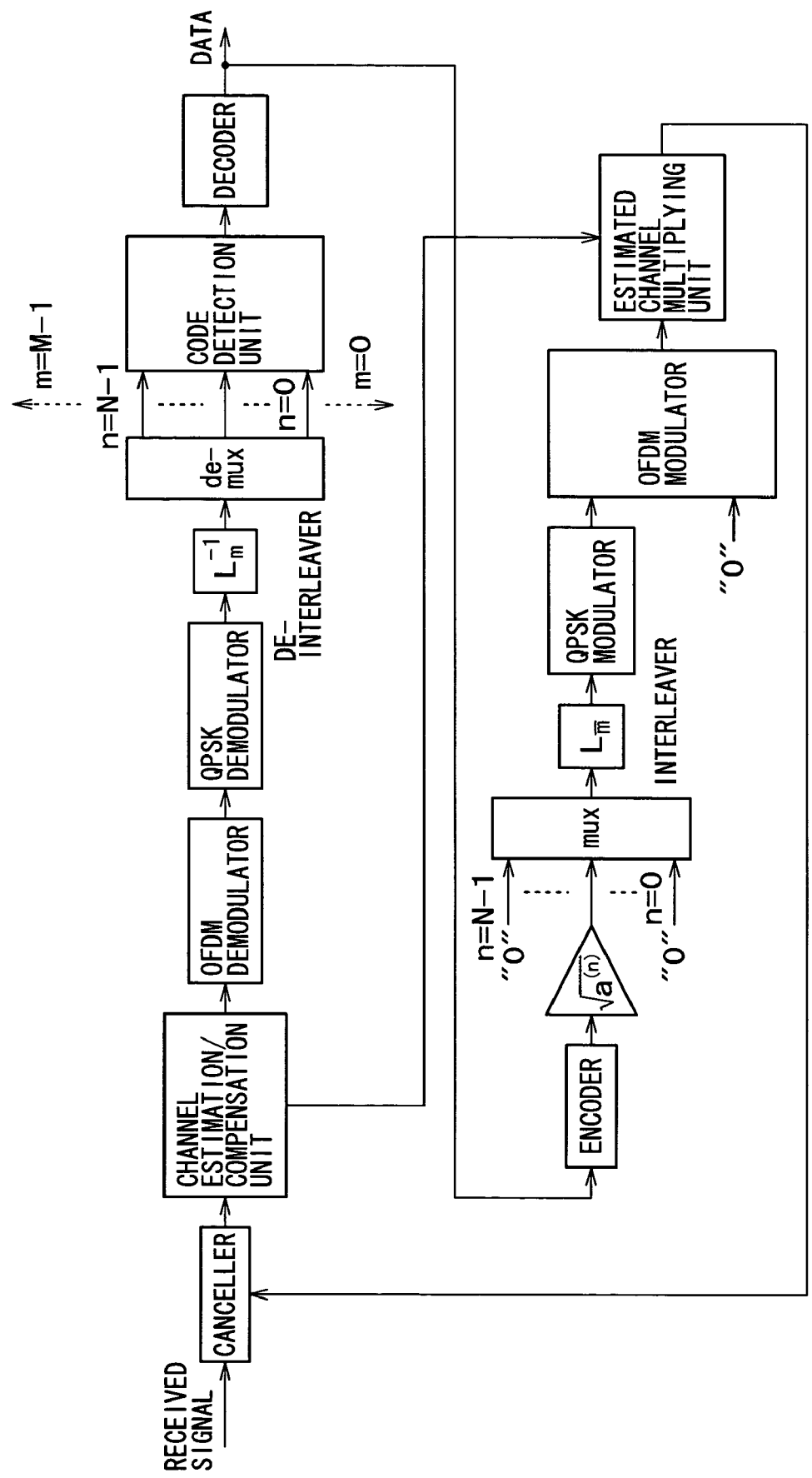
FIG. 16 is a schematic diagram showing a receiver configuration according to an embodiment of the present invention.

FIG. 16 is a schematic diagram showing a configuration of a receiver of the UCM according to the second embodiment of the present invention. The receiver shown in FIG. 16 is effective in receiving the transmitting signal from the transmitter shown in FIGS. 12 and 14, and besides, is adaptable to the transmitter according to the first embodiment shown in FIG. 3. The configuration and operations of this receiver are described in the following.

A channel estimation/compensation unit carries out phase compensation of the received signal from each cell with reference to channel fluctuations respectively estimated from the pilot symbols.

Then, the received signal is de-interleaved after having been passed through OFDM modulation and QPSK modulation. Upon completion of de-interleaving of the received signals of all the users, a code word detection unit selects the code word having the highest SINR, and decoding of the selected code follows.

The decoded data is encoded in a re-encoding unit shown in a lower stage of FIG. 16, and is followed by UCM multiplexing again. In this process, a symbol remained at present as it is not decoded is multiplexed as 0. In OFDM modulation, the pilot symbol is also treated as zero (0), and a canceller cancels of the pilot symbol from the received signal after estimated channel fluctuations are taken into consideration. The decoding and cancellation are repeatedly performed in this manner until decoding of all the required code words is achieved.

When the decoding performance greatly changed with the traffic fluctuations and/or the increase or decrease of the number of interference stations, the receiver sends information about these conditions to the transmitter. The transmitter side recalculates the amplitude value of each code with reference to the information sent from the receiver to effect multiplexing of the codes using the updated amplitude value. Alternatively, the transmitter may perform recalculation of the amplitude value by estimating the propagation path conditions of a transmitting link with reference to one's own received propagation path conditions. In the latter case, there is no need for any special procedure of sending information of the propagation path conditions or the like from the receiver to the transmitter.

Resetting of the amplitude value of each code word at the side of the transmitter by changing the number of code words for one frame leads to a change of a frame configuration, so that it is necessary to send information about these conditions to the receiver side. By contrast, when resetting of the amplitude value of each code was effected with reference to the number of considerable interference signals and the amplitude margin with the number of code words set constant, it is not necessary to send information about these conditions to the receiver.

C. Third Embodiment

The above second embodiment of the present invention treats the received signals in such a way as to broadly classify into the two categories, specifically, one including the desired signal and the considerable interference signal and the other including the unconsidered interference signal according to the magnitude of the reception power. Specifically, the significantly primary interference signal in the received signals so as have a great effect on the desired signal is treated as the considerable interference signal to perform calculation of the amplitude value of each code with reference to the number of considerable interference signals.

The intervals of the amplitude ratio are made narrower by setting the limitation on the number of considerable interference signals, with the result that the transmission power is suppressible down to a lower level. By contrast, it is noted that a large number of interference waves other than the considerable undesired waves are existent as a matter of fact. The "residual interference power" composed of the power sum of the undesired waves having been not considered to be the considerable undesired waves is attributable to the increase in the noise as judging from the receiver, leading to one of factors of degradation of the decoding performance.

Figure 17:
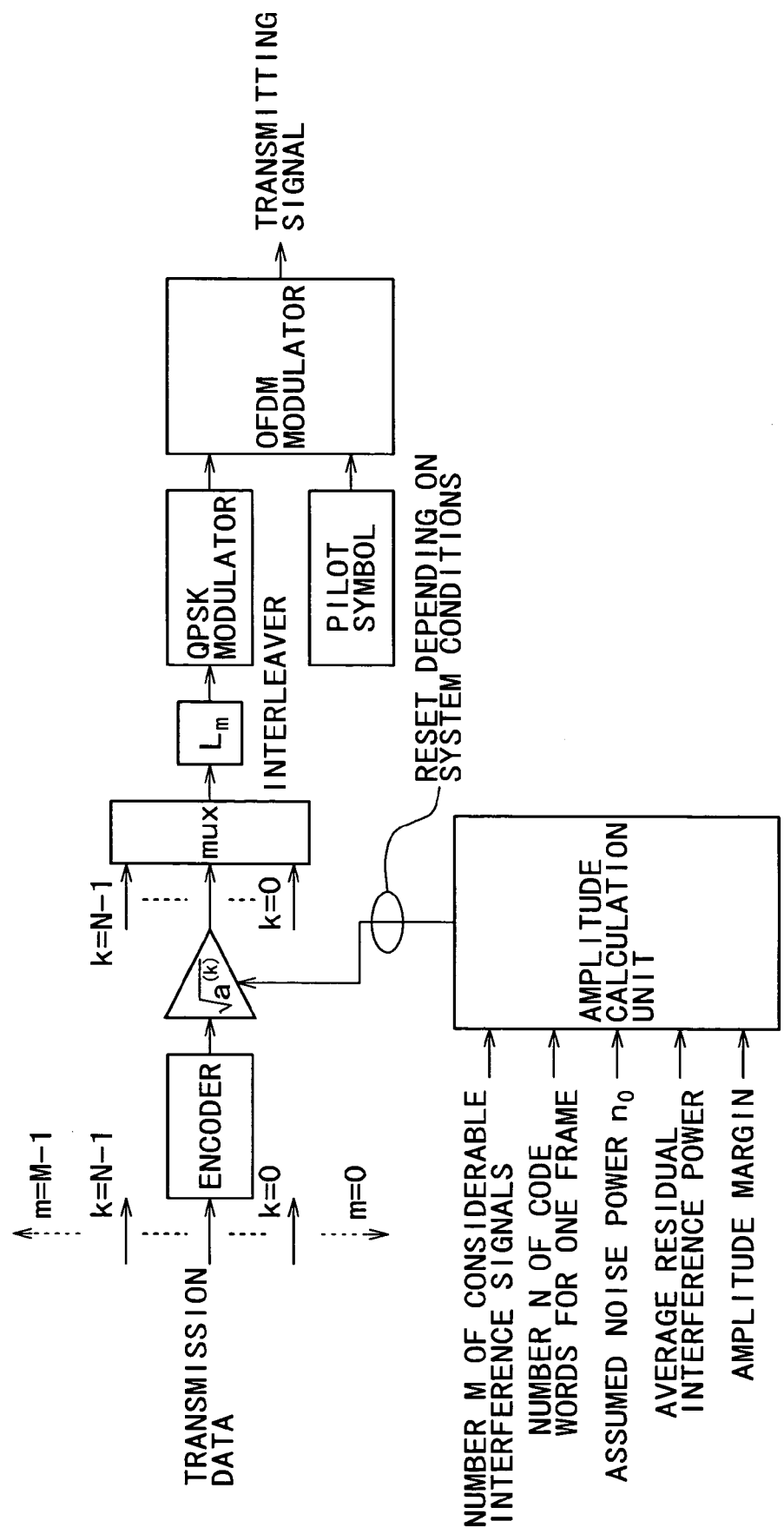
FIG. 17 is a schematic diagram showing a transmitter configuration of the UCM according to a third embodiment of the present invention.

In this connection, the third embodiment of the present invention is configured so that the amplitude value of each code is determined in consideration of the interference power of the whole system, inclusive of the residual interference power, in calculation of the amplitude value of each code. FIG. 17 is a schematic diagram showing a transmitter configuration of the UCM according to the third embodiment of the present invention. In FIG. 17, assume that M is the number of users (the number of interference signals), and N is the number of codes to be multiplexed using the UCM (the number of code words for one frame). It is noted that the cell is in the in-cell orthogonal arrangement and thus causes no in-cell interference, so that all the users are assumed to be in different cells, for the convenience of simplification of the following description. The configuration and operations of the transmitter shown in FIG. 17 are described in the following.

Transmission data is subjected to serial-to-parallel conversion and is then encoded with an encoder. The encoded transmission data is multiplied by the amplitude determined for each code word in the power amplification unit and is followed by time multiplexing with a multiplexer MUX.

The power amplification unit multiplies the k-th code word by the amplitude value $\sqrt{a^{(k)}}$ (provided that $0<k<N-1$). An amplitude calculation unit performs calculation of the amplitude value from the number of considerable interference signals, the number of code words for one frame and the noise power.

Then, the transmission data is interleaved over N pieces of codes successively with an interleaver $L_m$, is then subjected to QPSK modulation, for instance, and is followed by OFDM modulation together with the pilot symbol. In FIG. 12, there is shown an embodiment using QPSK as a modulation method. It is noted that random interleaving having a different pattern for each cell is adapted to the above interleaving. Also, the pilot symbol is assumed to be a unique orthogonal symbol for each cell.

The amplitude calculating unit in the third embodiment is to perform calculation of the amplitude value from the amplitude margin and average residual interference power, in addition to the number of considerable interference signals, the number of code words for one frame and the noise power. The average residual interference power specified herein is equivalent to the average value of the power with respect to the interference signals other than the desired signals and the considerable interference signals shown in FIG. 13.

Figure 18:
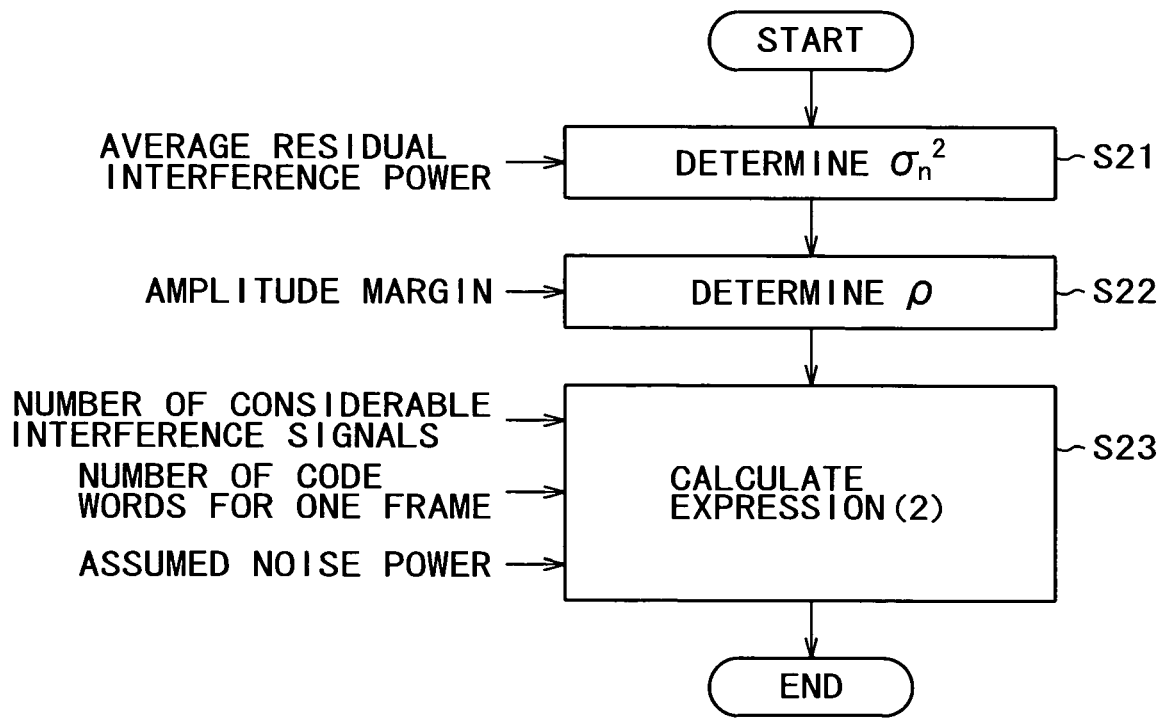
FIG. 18 is a flowchart showing a method for calculating an amplitude value of each code in an amplitude calculation unit.
Figure 19:
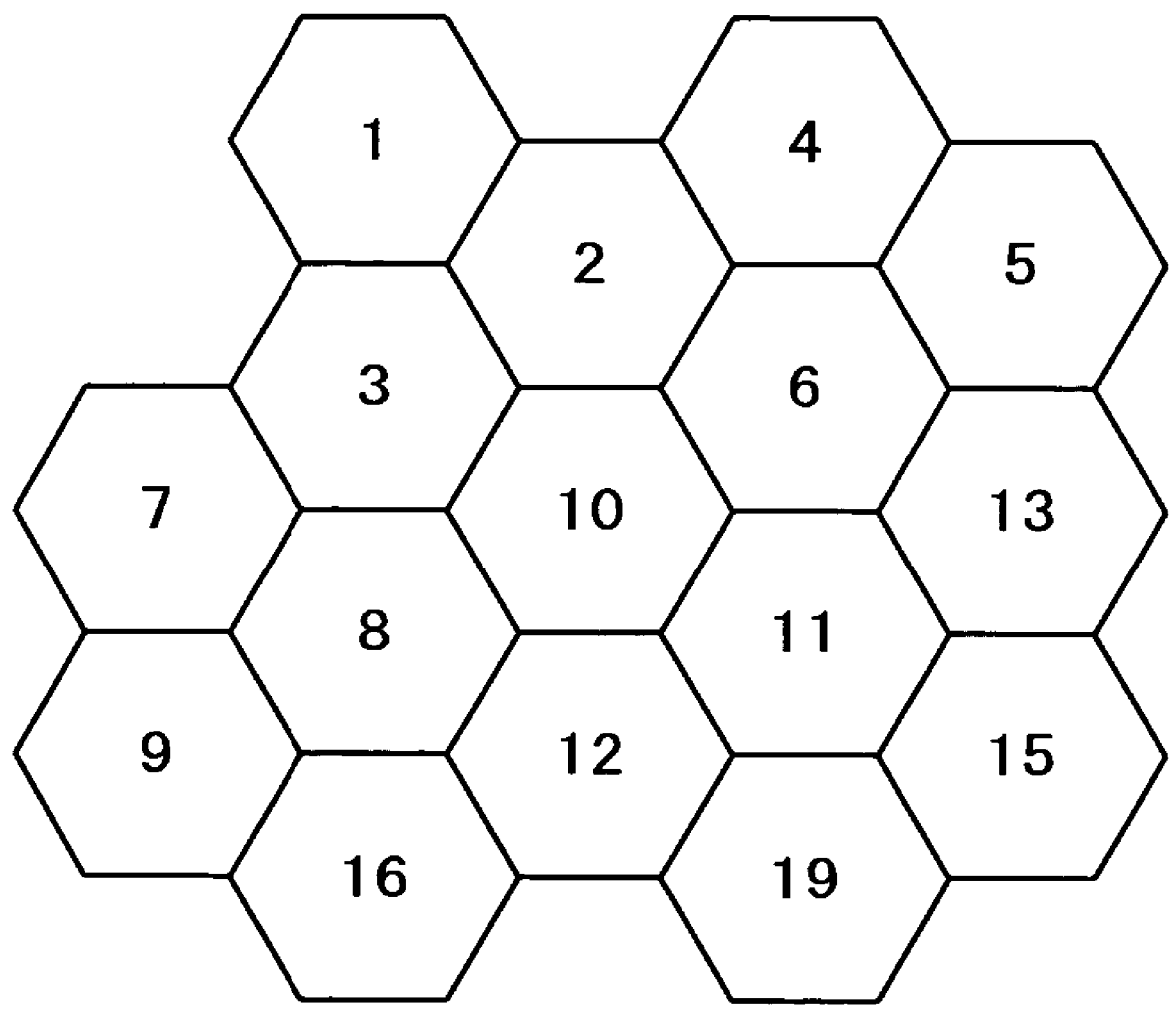
FIG. 19 is a schematic diagram showing a cell configuration in a mobile wireless communication system that permits planar development of a service area with a plurality of base stations.

A method for calculating the amplitude value of each code in the amplitude calculation unit is described with reference to FIG. 18.

The number M of considerable interference signals may be determined with reference to each user reception power detected in the channel estimation process performed at the time of signal reception, for instance. As judging from the embodiment shown in FIG. 13, the number M of considerable interference signals is that obtained by subtracting the number of desired signals (=1) from the number of signals exceeding the given threshold.

Also, assumed noise power no basically consists of a thermal noise, and is thus subject to no fluctuation (specifically, is treated as a constant).

The average residual interference power is equivalent to the average value of the unconsidered interference signal power, and is here applied to calculation of the amplitude value by increasing the dispersion of noise $\sigma_n^2$.

The amplitude margin is determined with reference to the SINR obtained by the channel estimation process and/or the error characteristics obtained at the time of signal decoding. Multiplying the required SNR, that is, $\rho$ by a certain value is adapted to adjustment of the amplitude margin.

First of all, the dispersion of noise $\sigma_n^2$ is determined in consideration of the average residual interference power (Step S21).

Next, the required SNR, that is, $\rho$ is determined for adjustment of the amplitude margin (Step S22).

Then, the amplitude value of the code is obtained (Step S23) by calculating the above expression (2) with substitution of the number M of considerable interference signals, the number N of code words for one frame and the assumed noise power $n_0$, together with the parameters obtained in the previous Steps S21 and S22.

It is noted that the receiver shown in FIG. 16 is assumed to be adaptable to the transmitter according to the third embodiment shown in FIG. 17.

For instance, measures to allow the base station that is operating as the transmitter according to the third embodiment to collect information of the average residual interference power from each terminal is taken to calculate the amplitude value of each code in consideration of the collected information. When the average residual interference power is of high level, a low-level code is supposed to be covered up by the residual interference, resulting in inadaptability of decoding. Thus, the amplitude of the low-level code needs to be set larger. In this case, the amplitude of a high-level code is also made larger, so that measures to adjust the number of considerable interference signals, the number of codes for one frame and the amplitude margin or the like should be taken to maintain the average transmission power.

Although the invention has been described in detail with reference to the specific embodiments, it is understood by those skilled in the art that various changes and modifications of the above embodiments may be made without departing from the spirit and scope of the invention. Specifically, the above embodiments of the invention are illustrative and not restrictive. The scope of the invention is therefore to be determined by the appended claims.

What is claimed is:

1. A communication system for increasing a capacity by implementing one-frequency reuse with a non-spread spectrum system, wherein:
   a transmitting station side including at least two sending stations each corresponding to a respective user, and employing a different interleave method configured to transmit a transmission signal obtained by segmenting transmission information into a plurality of frames, encoding each frame, power amplifying each encoded signal with a different amplitude, and interleaving all signals with each amplified signal collected into one channel; and
   a receiving station side configured to reproduce said transmission channel signal into original segmental frames by de-interleaving said transmitting signal from the at least two sending stations in correspondence to each different interleave method, sequentially decoding codes of the signal in descending order of Signal-to-Interference and Noise power Ratio, and re-encoding the decoded signal to successively cancel the re-encoded signal from said transmission signal,
   wherein the transmitting station side is configured to monitor propagation path conditions such as traffic conditions at certain intervals to update an amplitude value of each code with reference to a number of interference signals satisfying predetermined criteria, defining considerable interference signals, updated number of code words for one frame, and noise power according to said propagation path conditions.

2. The communication system according to claim 1, wherein the different interleaving methods correspond to different users.

3. The communication system according to claim 1, wherein the different interleaving methods correspond to different cells.

4. The communication system according to claim 1, wherein the transmitting station side is configured to change a rate of amplitude amplification for each frame according to a decoding capability of the receiving station side.

5. The communication system according to claim 1, wherein the transmitting station side is configured to determine the number of codes to be multiplexed according to a decoding capability or a process capability of the receiving station side.

6. The communication system according to claim 1, wherein the transmitting station side is configured to perform calculation of the amplitude value of each code by taking into account a residual interference power including a power sum of interference signals which are not the considerable interference signals.

7. The communication system according to claim 6, wherein the transmitting station side is configured to increase an amplitude of a low-level code when an average residual interference power exceeds a threshold level.

8. The communication system according to claim 7, wherein the transmitting station side is configured to adapt the adjustment of the number of considerable interference signals, the number of codes for one frame and an amplitude margin to maintain an average transmission power when an increase of the amplitude of the low-level code is attained.

9. A transmitting apparatus for transmitting information using a non-spread spectrum system, comprising:
   frame segmenting means for segmenting transmission information into a plurality of frames;
   encoding means for encoding each frame;
   power amplification means for power amplifying each encoded signal with different amplitude;
   said power amplification means changes a rate of amplitude amplification for each frame according to a decoding capability in a receiving station side;
   interleaving means for interleaving all signals with each amplified signal collected into one channel;
   transmitting means for transmitting a transmission signal obtained by the interleaving via the one channel; and
   propagation path condition monitoring means for monitoring propagation path conditions such as traffic conditions at predetermined intervals, wherein said power amplification means updates an amplitude value of each code with reference to a number of interference signals satisfying predetermined criteria, defining considerable interference signals, updated number of code words for one frame, and noise power according to said propagation path conditions.

10. The transmitting apparatus according to claim 9, wherein said frame segmenting means determines the number of codes to be multiplexed according to a decoding capability or a process capability of a receiving station side.

11. The transmitting apparatus according to claim 9, wherein said power amplification means performs calculation of the amplitude value of each code by taking into account a residual interference power including a power sum of interference signals which are not the considerable interference signals.

12. The transmitting apparatus according to claim 11, wherein said power amplification means increases an amplitude of a low-level code when an average residual interference power exceeds a threshold level.

13. The transmitting apparatus according to claim 12, wherein said power amplification means adapts adjustment of the number of considerable interference signals, the number of codes for one frame, and an amplitude margin to maintain an average transmission power when an increase in the amplitude of the low-level code is attained.

14. A transmitting method for transmitting information using a non-spread spectrum system, comprising:
   segmenting transmission information into a plurality of frames;
   encoding each frame;
   power amplifying each encoded signal with different amplitude said power amplification means changes a rate of amplitude amplification for each frame according to a decoding capability in a receiving station side;
   interleaving all signals with each amplified signal collected into one channel;
   transmitting a transmission signal obtained by the interleaving via the one channel; and
   monitoring propagation path conditions such as traffic conditions at certain intervals, wherein said power amplification updates an amplitude value of each code with reference to a number of interference signals satisfying predetermined criteria, defining considerable interference signals, updated number of code words for one frame, and noise power according to said propagation path conditions.

15. The transmitting method according to claim 14, wherein said frame segmenting means determines the number of codes to be multiplexed according to a decoding capability or a process capability of a receiving station side.

16. The transmitting method according to claim 14, wherein said power amplification performs calculation of the amplitude value of each code by taking into account a residual interference power including a power sum of interference signals which are not the considerable interference signals.

17. The transmitting method according to claim 16, wherein said power amplification increases the amplitude of a low-level code when an average residual interference power exceeds a threshold level.

18. The transmitting method according to claim 17, wherein said power amplification adapts adjustment of the number of considerable interference signals, the number of codes for one frame, and an amplitude margin to maintain an average transmission power when an increase in the amplitude of the low-level code is attained.

19. A receiving apparatus, comprising:
receiving means for receiving a transmission signal from at least two sending stations each corresponding to a user, and, each employing a different interleave method, the transmission signal obtained by encoding each frame resulting from segmentation of transmission information, power amplifying each encoded signal with a different amplitude, and interleaving all signals with each amplitude signal collected into one channel, and by monitoring propagation path conditions such as traffic conditions at certain intervals to update an amplitude value of each code with reference to a number of interference signals satisfying predetermined criteria, defining considerable interference signals, updated number of code words for one frame, and noise power according to said propagation path conditions,
de-interleaving means of de-interleaving said transmission signal from the at least two sending stations in correspondence to each different interleave method;
decoding means of successively decoding codes of the signal in descending order of Signal-to-Interference and Noise power Ratio; and
signal canceling means of re-encoding the decoded signal to successively cancel the re-encoded signal from said transmission signal.

20. A receiving method, comprising:
receiving a transmission signal from at least two sending stations each corresponding to a user, and each employing a different interleave method, the transmission signal obtained by encoding each frame resulting from segmentation of transmission information, power amplifying each encoded signal with a different amplitude, and interleaving all signals with each amplitude signal collected into one channel, and by
monitoring propagation path conditions such as traffic conditions at certain intervals to update an amplitude value of each code with reference to a number of interference signals satisfying predetermined criteria, defining considerable interference signals, updated number of code words for one frame, and noise power according to said propagation path conditions
de-interleaving said transmission signal from the at least two sending stations in correspondence to each different interleave method;
successively decoding codes of the signal in order of Signal to Interference and Noise power Ratio; and
re-encoding the decoded signal to successively cancel of the re-encoded signal from said transmission signal.

21. An unbalance code mixing method for carrying out an unbalance code mixing of information transmitted using a non-spread spectrum system, comprising:
segmenting transmission information into a plurality of frames;
encoding each frame;
power amplifying each encoded signal with a different amplitude said amplification changes a rate of amplitude amplification for each frame according to a decoding capability in a receiving station side; and
interleaving all signals with each amplified signal collected into one channel,
wherein said power amplification updates an amplitude value of each code with reference to a number of interference signals satisfying predetermined criteria, defining considerable interference signals, updated number of code words for one frame, and noise power according to said propagation path conditions.

22. The unbalance code mixing method according to claim 21, wherein said frame segmenting determines the number of codes to be multiplexed according to a decoding capability or a process capability realizable in a receiving station side.

23. The unbalance code mixing method according to claim 21, wherein said power amplification performs calculation of the amplitude value of each code by taking into account a residual interference power including a power sum of interference signals which are not the considerable interference signals.

24. The unbalance code mixing method according to claim 23, wherein said power amplification increases an amplitude of a low-level code when an average residual interference power exceeds a threshold level.

25. The unbalance code mixing method according to claim 24, wherein said power amplification adapts adjustment of the number of considerable interference signals, the number of code words for one frame and an amplitude margin to maintain an average transmission power, when an increase in the amplitude of the code of the low-level is attained.

26. A decoding method, comprising:
decoding a transmitting signal from at least two sending stations each corresponding to a user, and each employing a different interleave method, the transmission signal obtained by encoding each frame resulting from segmentation of transmission information, power amplifying each encoded signal with a different amplitude, and interleaving all signals with each amplitude signal collected into one channel, and
monitoring propagation path conditions such as traffic conditions at certain intervals to update an amplitude value of each code with reference to a number of interference signals satisfying predetermined criteria, defining considerable interference signals, updated number of code words for one frame, and noise power according to said propagation path conditions,
de-interleaving said transmission signal from the at least two sending stations in correspondence to each different interleave method;
decoding successively codes of the signal in descending order of Signal-to-Interference and Noise power Ratio; and
re-encoding the decoded signal to successively cancel the re-encoded signal from said transmission signal.

* * * * *